US011758292B2

(12) United States Patent
Kawai et al.

(10) Patent No.: US 11,758,292 B2
(45) Date of Patent: *Sep. 12, 2023

(54) IMAGING ELEMENT, IMAGING APPARATUS, IMAGING METHOD, AND PROGRAM

(71) Applicant: FUJIFILM CORPORATION, Tokyo (JP)

(72) Inventors: Tomoyuki Kawai, Saitama (JP); Ryo Hasegawa, Saitama (JP); Hitoshi Sakurabu, Saitama (JP); Makoto Kobayashi, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,225

(22) Filed: Sep. 12, 2022

(65) Prior Publication Data

US 2023/0007170 A1    Jan. 5, 2023

Related U.S. Application Data

(63) Continuation of application No. 17/348,780, filed on Jun. 16, 2021, now Pat. No. 11,509,823, which is a (Continued)

(30) Foreign Application Priority Data

Dec. 27, 2018   (JP) .............................. JP2018-245750

(51) Int. Cl.
*H04N 23/951*    (2023.01)
*H04N 23/73*    (2023.01)
(Continued)

(52) U.S. Cl.
CPC ........... *H04N 23/951* (2023.01); *G02B 7/102* (2013.01); *H04N 23/73* (2023.01); *G02B 7/14* (2013.01); *G03B 17/14* (2013.01)

(58) Field of Classification Search
CPC ...... H04N 23/951; H04N 23/73; G02B 7/102; G02B 7/14; G03B 17/14
See application file for complete search history.

(56) References Cited

U.S. PATENT DOCUMENTS 8,159,579 B2 * 4/2012  Jannard ................. H04N 5/235
                                                                348/222.1
9,288,377 B2 * 3/2016  Peng ...................... H04N 5/369
(Continued)

FOREIGN PATENT DOCUMENTS

CN     101651783 A    2/2010
CN     104754253 A    7/2015
(Continued)

OTHER PUBLICATIONS

International Search Report issued in International Application No. PCT/JP2019/049221 dated Mar. 3, 2020.
(Continued)

*Primary Examiner* — Ahmed A Berhan
(74) *Attorney, Agent, or Firm* — Solaris Intellectual Property Group, PLLC

(57) ABSTRACT

An imaging element incorporates a reading portion that reads out captured image data at a first frame rate, a storage portion that stores the image data, a processing portion that processes the image data, and an output portion that outputs the processed image data at a second frame rate lower than the first frame rate. The reading portion reads out the image data of each of a plurality of frames in parallel. The storage portion stores, in parallel, each image data read out in parallel by the reading portion. The processing portion performs generation processing of generating output image (Continued)

data of one frame using the image data of each of the plurality of frames stored in the storage portion.

15 Claims, 24 Drawing Sheets

Related U.S. Application Data continuation of application No. PCT/JP2019/049221, filed on Dec. 16, 2019.

(51) Int. Cl.
*G02B 7/10* (2021.01)
*G02B 7/14* (2021.01)
*G03B 17/14* (2021.01)

(56) References Cited

U.S. PATENT DOCUMENTS

| | | |
|---|---|---|
| 2010/0040344 A1 | 2/2010 | Mizuno et al. |
| 2015/0189214 A1 | 7/2015 | Kurose |

FOREIGN PATENT DOCUMENTS

| | | |
|---|---|---|
| JP | 2015-126043 A | 7/2015 |
| JP | 2017-22596 A | 1/2017 |
| JP | 2017-183870 A | 10/2017 |
| JP | 2017-225084 A | 12/2017 |

OTHER PUBLICATIONS

Written Opinion of the ISA issued in International Application No. PCT/JP2019/049221 dated Mar. 3, 2020.
Ex Parte Quayle Office Action issued by USPTO dated Apr. 11, 2022, in related U.S. Appl. No. 17/348,780.
Notice of Allowance issued by USPTO dated Jun. 17, 2022, in related U.S. Appl. No. 17/348,780.
English language translation of the following: Office action dated Sep. 5, 2022 from the SIPO in a Chinese patent application No. 201980084951.2 corresponding to the instant patent application. This office action translation is submitted now in order to supplement the understanding of the cited references which are being disclosed in the instant Information Disclosure Statement.

* cited by examiner

IMAGE OF FOURTH FRAME

IMAGE SEEN AS MOTION PICTURE IMAGE

IMAGE OF
SECOND FRAME

IMAGE OF
THIRD FRAME (CASE OF PERFORMING AD CONVERSION ON FIRST IMAGE DATA)

(CASE OF PERFORMING AD CONVERSION ON FIRST AND SECOND IMAGE DATA)

(CASE OF PERFORMING AD CONVERSION ON FIRST TO THIRD IMAGE DATA)

(CASE OF PERFORMING AD CONVERSION ON FIRST TO FOURTH IMAGE DATA)

IMAGING ELEMENT, IMAGING APPARATUS, IMAGING METHOD, AND PROGRAM

CROSS-REFERENCE TO RELATED APPLICATIONS

This application is a continuation application of U.S. application Ser. No. 17/348,780, filed Jun. 16, 2021, which is a continuation application of International Application No. PCT/JP2019/049221, filed Dec. 16, 2019, the disclosures of which are incorporated herein by reference in their entireties. Further, this application claims priority from Japanese Patent Application No. 2018-245750, filed Dec. 27, 2018, the disclosure of which is incorporated herein by reference in its entirety.

BACKGROUND

1. Technical Field

The technology of the present disclosure relates to an imaging element, an imaging apparatus, an imaging method, and a program.

2. Description of the Related Art

JP2015-126043A discloses an electronic device comprising a first semiconductor chip including a sensor portion that is formed by arranging a plurality of sensors, and a second semiconductor chip including a signal processing portion that processes signals acquired by the sensors. In the electronic device disclosed in JP2015-126043A, the first semiconductor chip and the second semiconductor chip are laminated.

In the electronic device disclosed in JP2015-126043A, a predetermined type of signal processing including AD conversion is performed on the signal read out from each sensor for each sensor row parallelly in units of sensor columns, and digitized image data is transferred to a memory portion by pipeline. By doing so, a large amount of information can be processed, and the electronic device as a whole can achieve low power consumption. Consequently, a decrease in performance of the sensors due to thermal noise can also be suppressed.

JP2017-225084A discloses an imaging element in which a plurality of pixels are broadly divided into a first pixel region and a second region. In the imaging element disclosed in JP2017-225084A, the first pixel region is a pixel region in which a first image signal is generated by performing imaging in a first exposure time period. The second region is a pixel region in which a second image signal from which information related to a subject is extracted is generated by performing imaging in a second exposure time period longer than the first exposure time period.

SUMMARY

One embodiment according to the technology of the present disclosure provides an imaging element, an imaging apparatus, an imaging method, and a program capable of outputting a smooth motion picture image, compared to a case of outputting an image captured in an exposure time period shorter than an exposure time period corresponding to an output frame rate.

An imaging element according to a first aspect comprises a reading portion that reads out, at a first frame rate, image data of each frame obtained by imaging a subject and is incorporated in the imaging element, a storage portion that stores the image data read out by the reading portion and is incorporated in the imaging element, a processing portion that processes the image data and is incorporated in the imaging element, and an output portion that outputs the image data processed by the processing portion at a second frame rate and is incorporated in the imaging element, in which first frame rate is a frame rate higher than the second frame rate, the reading portion reads out the image data of each of a plurality of frames in parallel within an output period that is defined by the second frame rate as a period in which the image data of one frame is output, the storage portion stores, in parallel, each image data read out in parallel by the reading portion, the processing portion performs generation processing of generating output image data of one frame using the image data of each of the plurality of frames stored in the storage portion, and the output portion outputs the output image data generated by the generation processing at the second frame rate.

Accordingly, a smooth motion picture image can be output, compared to a case of outputting an image captured in an exposure time period shorter than an exposure time period corresponding to an output frame rate.

In the imaging element according to a second aspect, the first frame rate is changed in connection with an exposure time period.

Accordingly, a change in brightness of the subject can be handled.

In the imaging element according to a third aspect, the first frame rate is increased as the exposure time period is decreased.

Accordingly, a relatively bright subject can be handled.

In the imaging element according to a fourth aspect, after a start of exposure, the exposure for imaging is restarted after reading processing for the image data of at least one pixel by the reading portion is completed.

Accordingly, a time period of non-exposure between the previous exposure and the subsequent exposure can be relatively decreased regardless of the exposure time period.

In the imaging element according to a fifth aspect, the reading portion changes a reading speed of the image data in accordance with the number of frames in which the image data is read out in parallel.

Accordingly, the image data can be processed without delay.

In the imaging element according to a sixth aspect, the reading portion changes the reading speed of the image data in accordance with the number of frames in which the image data is read out in parallel, and the number of AD conversion circuits performing AD conversion on the read image data.

Accordingly, even in a case where the number of AD conversion circuits is limited, the image data can be processed without delay.

In the imaging element according a seventh aspect, the reading portion changes a data amount in a case of performing AD conversion processing on the image data, in accordance with the number of frames in which the image data is read out in parallel, and the number of AD conversion circuits performing AD conversion on the read image data.

Accordingly, even in a case where the number of AD conversion circuits is limited, the image data can be processed without delay.

In the imaging element according to an eighth aspect, the storage portion includes a plurality of storage regions individually storing each of the plurality of pieces of image data.

Accordingly, the plurality of pieces of image data can be stored in parallel.

In the imaging element according to a ninth aspect, the generation processing is processing of generating image data of one frame obtained by calculating an arithmetic mean of at least a part of the image data of each of the plurality of frames stored in the storage portion in units of pixels.

Accordingly, overexposure and deterioration of image quality can be suppressed.

In the imaging element according to a tenth aspect, in the generation processing, the output image data of one frame is generated by combining partial image data that is a part of the image data, from a plurality of pieces of the image data.

Accordingly, the output image data of which a part is temporally new can be output.

In the imaging element according to an eleventh aspect, at least a photoelectric conversion element and the storage portion are formed in one chip.

Accordingly, portability of the imaging element can be increased, compared to an imaging element in which the photoelectric conversion element and the storage portion are not formed in one chip.

In the imaging element according to a twelfth aspect, the imaging element is a laminated imaging element in which the photoelectric conversion element is laminated with the storage portion.

Accordingly, a load exerted on processing between the photoelectric conversion element and the storage portion can be reduced, compared to a an imaging element in which the photoelectric conversion element and the storage portion are not laminated.

An imaging apparatus according to a thirteenth aspect comprises the imaging element according to any one of the first to twelfth aspects, and a control portion that performs a control for displaying an image based on the output image data output by the output portion on a display portion.

Accordingly, a user can visually recognize the image based on the plurality of pieces of image data output by the output portion.

An imaging method according to a fourteenth aspect is an imaging method comprising a step of reading out, at a first frame rate, image data of each frame obtained by imaging a subject, a step of storing the read image data, a step of processing the image data, and a step of outputting the processed image data at a second frame rate lower than the first frame rate, in which in the step of reading out, the image data of each of a plurality of frames is read out in parallel within an output period that is defined by the second frame rate as a period in which the image data of one frame is output, in the step of storing, each image data read out in parallel is stored in parallel, in the step of processing, output image data of one frame is generated using the stored image data of each of a plurality of frames, and in the step of outputting, the generated output image data is output at the second frame rate.

Accordingly, a smooth motion picture image can be output, compared to a case of outputting an image captured in an exposure time period shorter than an exposure time period corresponding to an output frame rate.

A program according to a fifteenth aspect is a program causing a computer to execute a procedure of reading out, at a first frame rate, image data of each frame obtained by imaging a subject, a procedure of storing the read image data, a procedure of processing the image data, and a procedure of outputting the processed image data at a second frame rate lower than the first frame rate, in which in the procedure of reading out, the image data of each of a plurality of frames is read out in parallel within an output period that is defined by the second frame rate as a period in which the image data of one frame is output, in the procedure of storing, each image data read out in parallel is stored in parallel, in the procedure of processing, output image data of one frame is generated using the stored image data of each of a plurality of frames, and in the procedure of outputting, the generated output image data is output at the second frame rate.

Accordingly, a smooth motion picture image can be output, compared to a case of outputting an image captured in an exposure time period shorter than an exposure time period corresponding to an output frame rate.

An imaging element according to one embodiment of the present disclosure comprises a memory that stores image data and is incorporated in the imaging element, and a processor configured to read out, at a first frame rate, image data of each frame obtained by imaging a subject, process the image data, and output the image data processed by the processing portion at a second frame rate lower than the first frame rate, in which the processor is configured to read out the image data of each of a plurality of frames in parallel within an output period that is defined by the second frame rate as a period in which the image data of one frame is output, store, in parallel, each image data read out in parallel in the memory, generate output image data of one frame using the stored image data of each of the plurality of frames, and output the generated output image data at the second frame rate.

BRIEF DESCRIPTION OF THE DRAWINGS

Exemplary embodiments of the technology of the disclosure will be described in detail based on the following figures, wherein.

DETAILED DESCRIPTION

Hereinafter, an example of embodiments of the technology of the present disclosure will be described with reference to the drawings.

First, terms used in the following description will be described. In the following description, the abbreviation "AD" stands for "Analog-to-Digital". The abbreviation "OVF" stands for "Optical View Finder". The abbreviation "EVF" stands for "Electronic View Finder". The abbreviation "AE" stands for "Auto Exposure". The abbreviation "CMOS" stands for "Complementary Metal Oxide Semiconductor". The abbreviation "CCD" stands for "Charge Coupled Device". The abbreviation "LSI" stands for "Large-Scale Integration". The abbreviation "CPU" stands for "Central Processing Unit". The abbreviation "ROM" stands for "Read Only Memory". The abbreviation "RAM" stands for "Random Access Memory". The abbreviation "I/F" stands for "Interface". The abbreviation "ASIC" stands for "Application Specific Integrated Circuit". The abbreviation "PLD" stands for "Programmable Logic Device". The abbreviation "FPGA" stands for "Field Programmable Gate Array". The abbreviation "SSD" stands for "Solid State Drive". The abbreviation "USB" stands for "Universal Serial Bus". The abbreviation "CD-ROM" stands for "Compact Disc Read Only Memory". The abbreviation "IC" stands for "Integrated Circuit". The abbreviation "HDD" stands for "Hard Disc Drive". The abbreviation "DRAM" stands for "Dynamic Random Access Memory". The abbreviation "SRAM" stands for "Static Random Access Memory". The abbreviation "PC" stands for "Personal Computer". The abbreviation "fps" stands for "frame per second".

First Embodiment

Hereinafter, an example of embodiments of an imaging apparatus according to the embodiments of the technology of the present disclosure will be described in accordance with the appended drawings.

Figure 1:
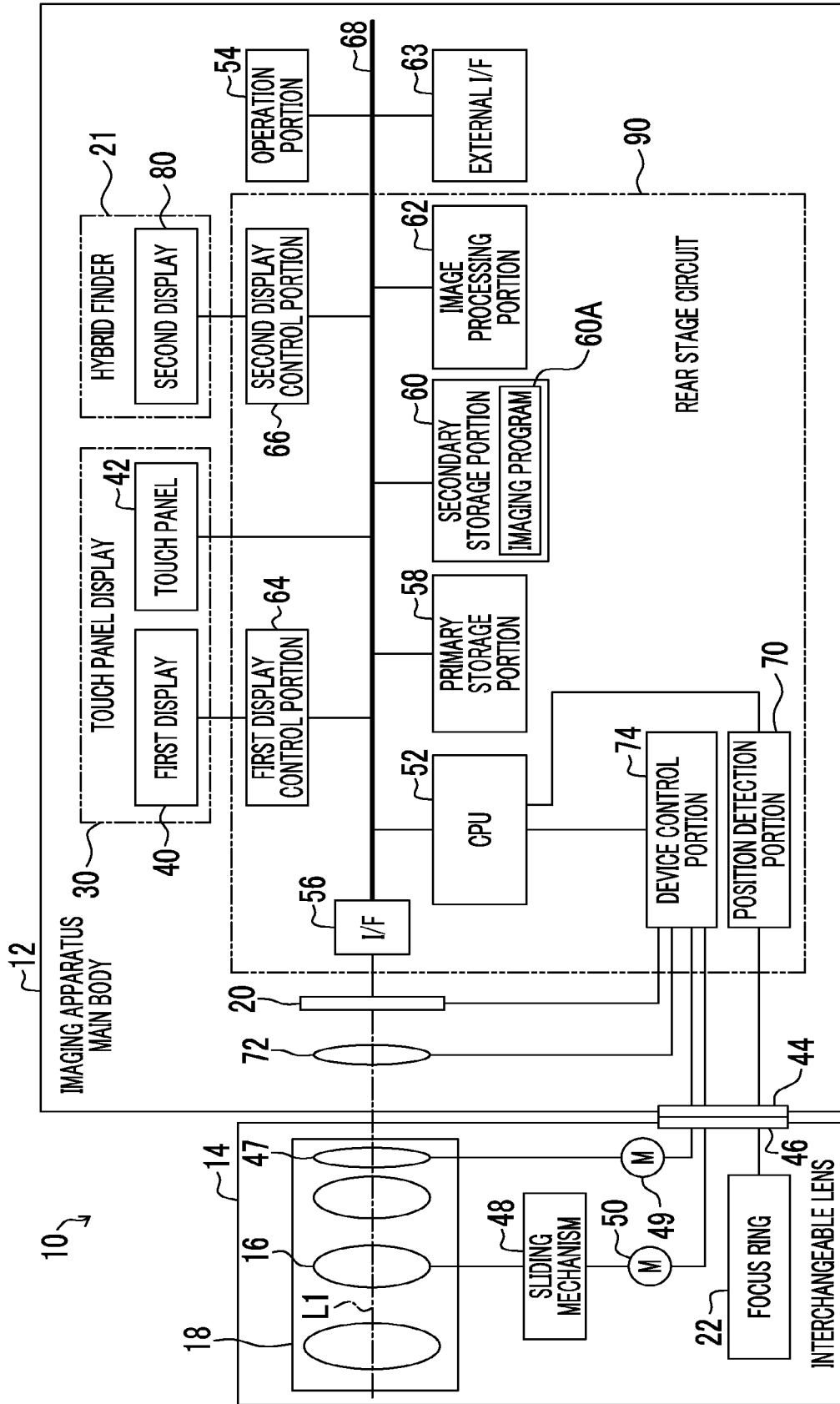
FIG. 1 is a block diagram illustrating an example of a hardware configuration of an imaging apparatus according to a first embodiment.

As illustrated in FIG. 1 as an example, an imaging apparatus 10 is an interchangeable lens camera. The imaging apparatus 10 includes an imaging apparatus main body 12 and an interchangeable lens 14 that is interchangeably mounted on the imaging apparatus main body 12. The interchangeable lens 14 includes an imaging lens 18 including a focus lens 16 that is movable in a direction of an optical axis L1 by a manual operation.

A hybrid finder (registered trademark) 21 is disposed in the imaging apparatus main body 12. For example, the hybrid finder 21 here refers to a finder in which an optical viewfinder (hereinafter, referred to as the OVF) and an electronic viewfinder (hereinafter, referred to as the EVF) are selectively used. The EVF includes a second display 80.

The interchangeable lens 14 is interchangeably mounted on the imaging apparatus main body 12. A focus ring 22 that is used in a case of a manual focus mode is disposed in a lens barrel of the interchangeable lens 14. The focus lens 16 moves in the direction of the optical axis L1 in accordance with a manual rotation operation of the focus ring 22. The focus lens 16 is stopped at a focal position corresponding to a subject distance. In the present embodiment, the "focal position" refers to a position of the focus lens 16 on the optical axis L1 in a focused state.

A touch panel display 30 is disposed on a rear surface of the imaging apparatus main body 12. The touch panel display 30 comprises a liquid crystal display (hereinafter, referred to as a "first display") 40 and a touch panel 42. The first display 40 or the second display 80 is an example of a "display portion" according to the embodiments of the technology of the present disclosure.

The first display 40 displays images, text information, and the like. The first display 40 is used for displaying the live view image (live preview image) that is an example of a consecutive frame image obtained by imaging in consecutive frames in a case of the imaging mode. In addition, the first display 40 is used for displaying a still picture image that is an example of a single frame image obtained by imaging in a single frame in a case where a still picture imaging instruction is provided. Furthermore, the first display 40 is used for displaying a playback image and displaying a menu screen and the like in the playback mode.

The touch panel 42 is a transmissive touch panel and is overlaid on a surface of a display region of the first display 40. The touch panel 42 detects a contact of an instruction object such as a finger or a stylus pen.

The imaging apparatus 10 includes a mount 44 comprised in the imaging apparatus main body 12, and a mount 46 on an interchangeable lens 14 side corresponding to the mount 44. The interchangeable lens 14 is interchangeably mounted on the imaging apparatus main body 12 by joining the mount 46 to the mount 44.

The imaging lens 18 includes a stop 47. The stop 47 is arranged closer to the imaging apparatus main body 12 side than the focus lens 16 and is connected to a motor 49. The stop 47 operates by receiving motive power of the motor 49 and adjusts the exposure.

The interchangeable lens 14 includes a sliding mechanism 48 and a motor 50. The sliding mechanism 48 moves the focus lens 16 along the optical axis L1 by operating the focus ring 22. The focus lens 16 is attached to the sliding mechanism 48 in a slidable manner along the optical axis L1. The motor 50 is connected to the sliding mechanism 48, and the sliding mechanism 48 slides the focus lens 16 along the optical axis L1 by receiving motive power of the motor 50.

The motors 49 and 50 are connected to the imaging apparatus main body 12 through the mounts 44 and 46, and driving thereof is controlled in accordance with a command from the imaging apparatus main body 12. In the present embodiment, stepping motors are applied as an example of the motors 49 and 50. Accordingly, the motors 49 and 50 operate in synchronization with pulse electric power in accordance with the command from the imaging apparatus main body 12.

The imaging apparatus 10 is a digital camera that records a still picture image and a motion picture image obtained by imaging a subject. The imaging apparatus main body 12 comprises an operation portion 54, an external interface (I/F) 63, and a rear stage circuit 90. The rear stage circuit 90 is a circuit on a side of receiving data transmitted from the imaging element 20. In the present embodiment, an IC is employed as the rear stage circuit 90. An LSI is illustrated as an example of the IC.

The rear stage circuit 90 includes a CPU 52, an I/F 56, a primary storage portion 58, a secondary storage portion 60, an image processing portion 62, a first display control portion 64, a second display control portion 66, a position detection portion 70, and a device control portion 74. A single CPU is illustrated as the CPU 52 in the present embodiment. However, the technology of the present disclosure is not limited thereto, and a plurality of CPUs may be employed instead of the CPU 52. The CPU 52 is an example of a "control portion (control processor)" according to the embodiments of the technology of the present disclosure.

In the present embodiment, each of the image processing portion 62, the first display control portion 64, the second display control portion 66, the position detection portion 70, and the device control portion 74 is implemented by an ASIC. However, the technology of the present disclosure is not limited thereto. For example, at least one of a PLD or an FPGA may be employed instead of the ASIC. In addition, at least two of the ASIC, the PLD, or the FPGA may be employed. In addition, a computer including a CPU, a ROM, and a RAM may be employed. The number of CPUs may be singular or plural. In addition, at least one of the image processing portion 62, the first display control portion 64, the second display control portion 66, the position detection portion 70, or the device control portion 74 may be implemented by a combination of a hardware configuration and a software configuration.

The CPU 52, the I/F 56, the primary storage portion 58, the secondary storage portion 60, the image processing portion 62, the first display control portion 64, the second display control portion 66, the operation portion 54, the external I/F 63, and the touch panel 42 are connected to each other through a bus 68.

The CPU 52 controls the entire imaging apparatus 10. In the imaging apparatus 10 according to the present embodiment, in a case of the auto-focus mode, the CPU 52 performs the focusing control by controlling driving of the motor 50 such that a contrast value of the image obtained by imaging is maximized. In addition, in a case of the auto-focus mode, the CPU 52 calculates AE information that is a physical quantity indicating brightness of the image obtained by imaging. In the imaging mode, the CPU 52 derives an exposure time period (shutter speed) and an F number corresponding to the brightness of the image indicated by the AE information. An exposure state is set by controlling each related portion to achieve the derived exposure time period and the F number.

The primary storage portion 58 means a volatile memory and refers to, for example, a RAM. The secondary storage portion 60 means a non-volatile memory and refers to, for example, a flash memory or an HDD.

The secondary storage portion 60 stores an imaging program 60A. The CPU 52 reads out the imaging program 60A from the secondary storage portion 60 and loads the read imaging program 60A into the primary storage portion 58. The CPU 52 executes processing from imaging to displaying in accordance with the imaging program 60A loaded in the primary storage portion 58.

The operation portion 54 is a user interface that is operated by the user in a case of issuing various instructions to the rear stage circuit 90. The various instructions received by the operation portion 54 are output to the CPU 52 as an operation signal. The CPU 52 executes processing corresponding to the operation signal input from the operation portion 54.

The position detection portion 70 is connected to the CPU 52. The position detection portion 70 is connected to the focus ring 22 through the mounts 44 and 46, detects a rotation angle of the focus ring 22, and outputs rotation angle information indicating the rotation angle that is a detection result, to the CPU 52. The CPU 52 executes processing corresponding to the rotation angle information input from the position detection portion 70.

In a case where the imaging mode is set, an image of subject light is formed on a light receiving surface of the color imaging element 20 through the imaging lens 18 including the focus lens 16, and a mechanical shutter 72.

The device control portion 74 is connected to the CPU 52. In addition, the device control portion 74 is connected to the imaging element 20 and the mechanical shutter 72. Furthermore, the device control portion 74 is connected to the motors 49 and 50 of the imaging lens 18 through the mounts 44 and 46. The device control portion 74 controls the imaging element 20, the mechanical shutter 72, and the motors 49 and 50 under control of the CPU 52.

Figure 2A:
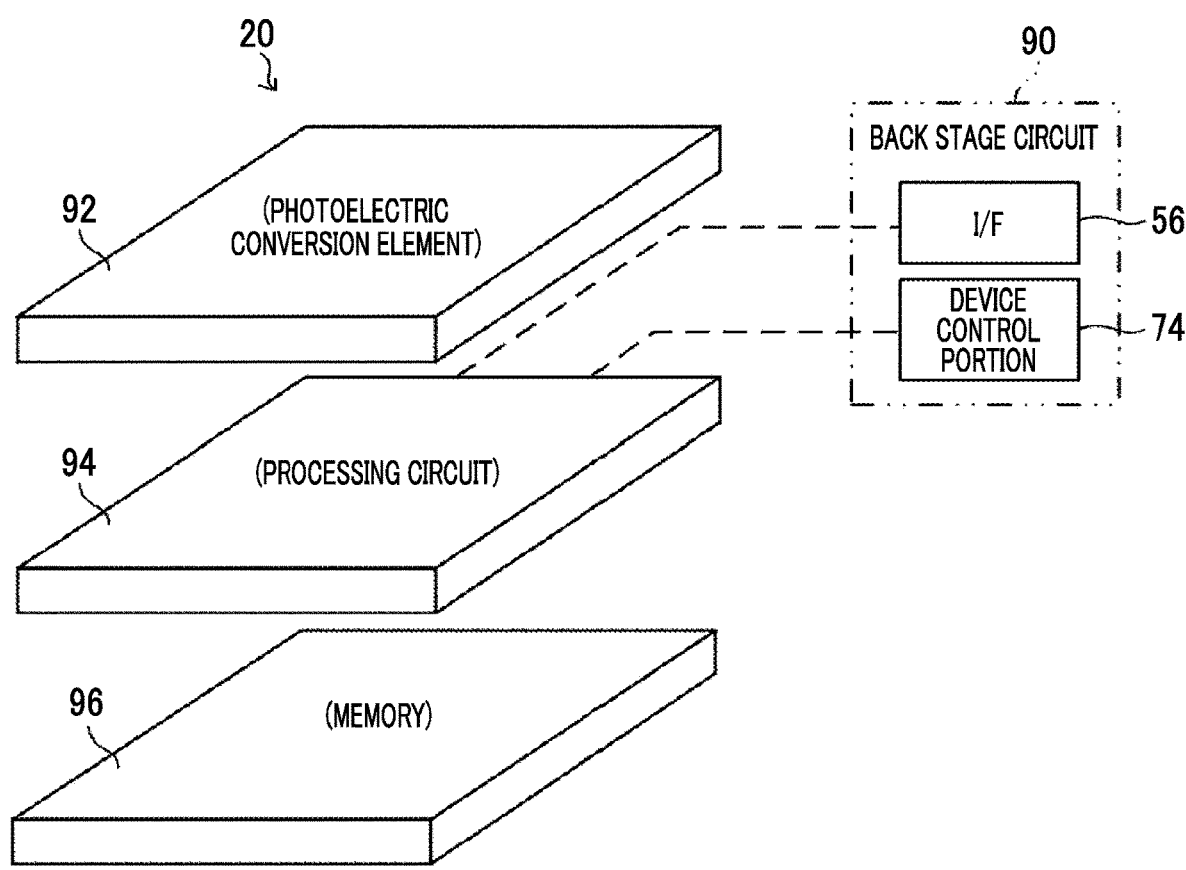
FIG. 2A is a schematic configuration diagram illustrating an example of a schematic configuration of an imaging element included in the imaging apparatus according to the first embodiment.

The imaging element 20 is an example of a "laminated imaging element" according to the embodiments of the technology of the present disclosure. For example, the imaging element 20 is a CMOS image sensor. As illustrated in FIG. 2A as an example, the imaging element 20 incorporates a photoelectric conversion element 92, a processing circuit 94, and a memory 96. It is preferable that at least the photoelectric conversion element 92 and the memory 96 are formed in one chip in the imaging element 20. By forming at least the photoelectric conversion element 92 and the memory 96 in one chip, portability of the imaging element can be increased, compared to an imaging element in which the photoelectric conversion element 92 and the memory 96 are not formed in one chip. FIG. 2A illustrates the imaging element 20 in which the photoelectric conversion element 92, the processing circuit 94, and the memory 96 are formed in one chip by lamination. Specifically, the photoelectric conversion element 92 and the processing circuit 94 are electrically connected to each other by a bump (not illustrated) of copper or the like having conductivity. The processing circuit 94 and the memory 96 are also electrically connected to each other by a bump (not illustrated) of copper or the like having conductivity.

The imaging element 20 is a laminated imaging element in which the photoelectric conversion element 92 and the memory 96 are laminated. By laminating the photoelectric conversion element 92 with the memory 96, a load exerted on processing between the photoelectric conversion element 92 and the memory 96 is reduced, compared to an imaging element in which the photoelectric conversion element 92 and the memory 96 are not laminated.

Figure 3:
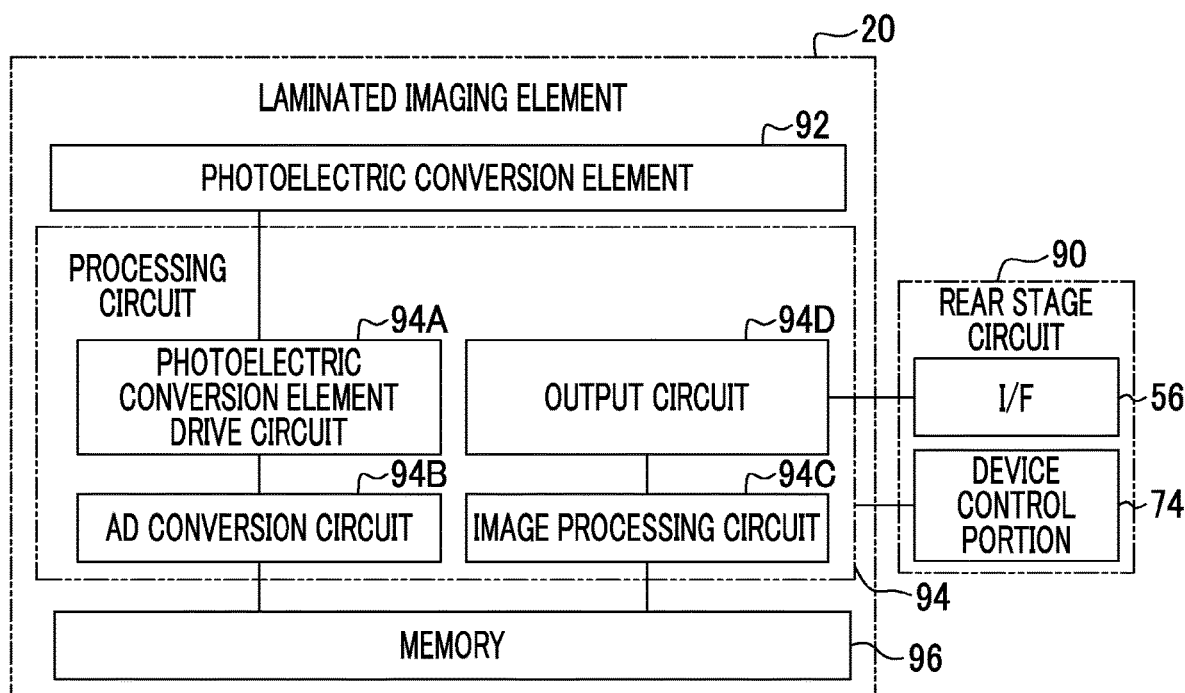
FIG. 3 is a block diagram illustrating an example of a main configuration of the imaging element included in the imaging apparatus according to the first embodiment.

As illustrated in FIG. 3 as an example, the processing circuit 94 is an example of a "processor" according to the embodiments of the technology of the present disclosure and includes a photoelectric conversion element driving circuit 94A, an AD conversion circuit 94B, an image processing circuit 94C, and an output circuit 94D. The processing circuit 94 operates under control of the CPU 52 through the device control portion 74.

The photoelectric conversion element driving circuit 94A is connected to the photoelectric conversion element 92 and the AD conversion circuit 94B. The memory 96 is connected to the AD conversion circuit 94B and the image processing circuit 94C. The image processing circuit 94C is connected to the output circuit 94D. The output circuit 94D is connected to the I/F 56 of the rear stage circuit 90.

The photoelectric conversion element driving circuit 94A controls the photoelectric conversion element 92 and reads out captured image data from the photoelectric conversion element 92 under control of the CPU 52. The "captured image data" here refers to analog image data indicating the subject. The AD conversion circuit 94B digitizes, by AD conversion, the analog image data read out by the photoelectric conversion element driving circuit 94A and stores the digitized image data in the memory 96. The memory 96 can store image data of a plurality of frames. The image processing circuit 94C processes the image data stored in the memory 96. The photoelectric conversion element driving circuit 94A is an example of a "reading portion" according to the embodiments of the technology of the present disclosure. The memory 96 is an example of a "storage portion" according to the embodiments of the technology of the present disclosure. The image processing circuit 94C is an example of a "processing portion" according to the embodiments of the technology of the present disclosure. The output circuit 94D is an example of an "output portion" according to the embodiments of the technology of the present disclosure.

The processing circuit 94 is, for example, an LSI, and the memory 96 is, for example, a RAM. A DRAM is employed as an example of the memory 96 in the present embodiment. However, the technology of the present disclosure is not limited thereto, and an SRAM may be used.

In the present embodiment, the processing circuit 94 is implemented by an ASIC. However, the technology of the present disclosure is not limited thereto. For example, at least one of a PLD or an FPGA may be employed instead of the ASIC. In addition, at least two of the ASIC, the PLD, or the FPGA may be employed. In addition, a computer including a CPU, a ROM, and a RAM may be employed. The number of CPUs may be singular or plural. In addition, the processing circuit 94 may be implemented by a combination of a hardware configuration and a software configuration.

The photoelectric conversion element 92 includes a plurality of photosensors (hereinafter, referred to as pixels) arranged in a matrix form. In the present embodiment, photodiodes are employed as an example of the photosensors. In addition, photodiodes of "4896 columns×3265 rows" pixels are illustrated as an example of the plurality of photosensors. Hereinafter, a row of pixels may be referred to as a line.

The photoelectric conversion element 92 comprises color filters. The color filters include a G filter corresponding to green (G) that most contributes to obtaining a brightness signal, an R filter corresponding to red (R), and a B filter corresponding to blue (B). In the present embodiment, the G filter, the R filter, and the B filter are arranged with predetermined periodicity in each of a row direction (horizontal direction) and a column direction (vertical direction) for the plurality of photodiodes of the photoelectric conversion element 92. Thus, the imaging apparatus 10 can perform processing in accordance with a repeating pattern in a case of performing demosaicing and the like on R, G, and B signals. The demosaicing refers to processing of calculating every color information for each pixel from a mosaic image corresponding to color filter arrangement of a single plate color imaging element. For example, in a case of an imaging element consisting of color filters of three colors of R, G, and B, the demosaicing means processing of calculating color information about all of R, G, and B for each pixel from a mosaic image consisting of R, G, and B.

While the CMOS image sensor is illustrated here as the imaging element 20, the technology of the present disclosure is not limited thereto. For example, the technology of the present disclosure is also established in a case where the photoelectric conversion element 92 is a CCD image sensor.

The imaging element 20 has a so-called electronic shutter function and controls an electric charge accumulation time period of each photodiode in the photoelectric conversion element 92 by performing the electronic shutter function under control of the device control portion 74. The electric charge accumulation time period refers to a so-called exposure time period.

In the imaging apparatus 10, imaging for the still picture image and imaging for the motion picture image such as the live view image are performed using a rolling shutter method. The imaging for the still picture image is implemented by performing the electronic shutter function and operating the mechanical shutter 72. The imaging for the motion picture image is implemented by performing the electronic shutter function without operating the mechanical shutter 72.

The processing circuit 94 is controlled by the CPU 52 through the device control portion 74. The processing circuit 94 reads out the analog image data of each frame obtained by imaging the subject by the photoelectric conversion element 92. The analog image data is data based on signal electric charges accumulated in the photoelectric conversion element 92. The processing circuit 94 performs the AD conversion on the analog image data read out from the photoelectric conversion element 92. The processing circuit 94 stores digital image data obtained by performing the AD conversion on the analog image data in the memory 96. The processing circuit 94 acquires the digital image data from the memory 96, processes the acquired image data, and outputs the image data to the I/F 56 of the rear stage circuit 90 as output image data. Hereinafter, the analog or digital image data will be simply referred to as the "image data".

A first frame rate is a frame rate related to a time period from a start of exposure in the photoelectric conversion element 92, then reading of the image data of one frame captured by the exposure from the photoelectric conversion element 92, performing of the AD conversion on the read image data, and storage of the image data subjected to the AD conversion in the memory 96. A second frame rate is a frame rate related to a time period required for outputting the output image data of one frame to an outside of the imaging element 20. For example, the "outside of the imaging element 20" here refers to the I/F 56 of the rear stage circuit 90. The first frame rate is a frame rate higher than the second frame rate.

In the first embodiment, 60 frames per second (fps) is employed as an example of the second frame rate. However, the technology of the present disclosure is not limited thereto. The second frame rate can be changed as long as a relationship "second frame rate 21 first frame rate" is satisfied. In addition, the first frame rate can be changed within a range of not less than or equal to the second frame rate. Hereinafter, an output period of one frame output at the second frame rate will be simply referred to as the "output period". In a case where the second frame rate is 60 fps, the output period is 1/60 second (16.667 milliseconds).

The image data of one frame is obtained by performing exposure of the imaging element 20 once. In the first embodiment, the exposure and reading processing for the image data are performed for each line using the rolling shutter method. In a case where the exposure of one line is finished, reading of electric charges of the line, the AD conversion, storage of the image data subjected to the AD conversion in the memory 96, and resetting are executed. The reading to the resetting will be referred to as the reading processing for the image data.

Here, a problem in a case where the first frame rate and the second frame rate are the same will be described before describing a detailed operation of the imaging element 20 according to the first embodiment.

Figure 4A:
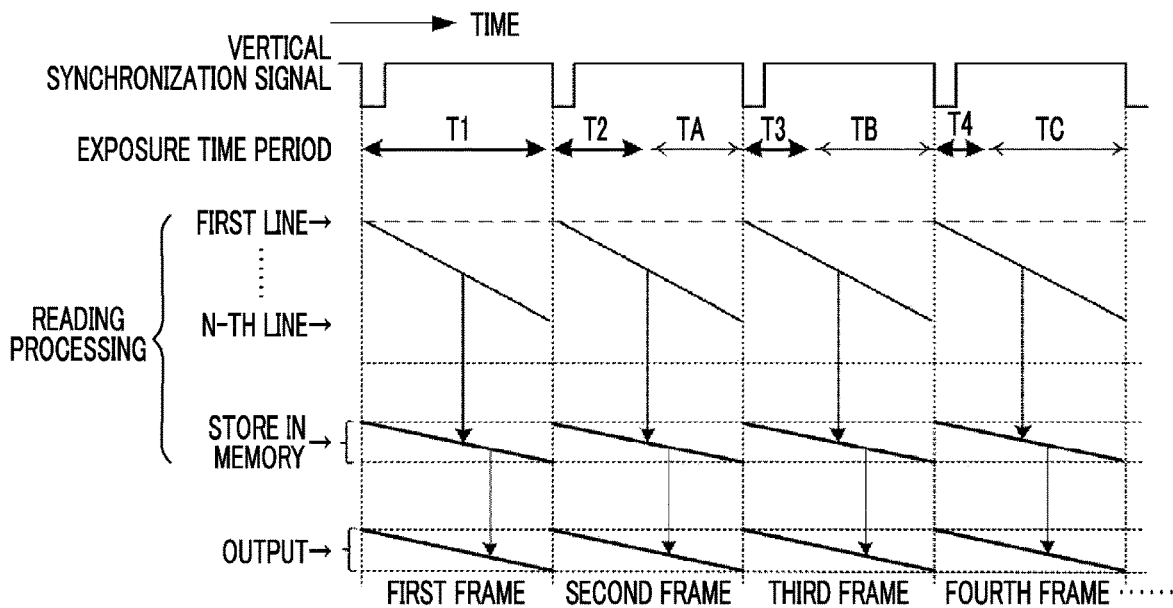
FIG. 4A is a conceptual diagram schematically illustrating an operation of exposure, reading, storage, and output of the imaging element.

As illustrated in FIG. 4A as an example, a case of performing the reading processing and the output in a case where the first frame rate and the second frame rate are the same 60 fps will be described. A horizontal axis in FIG. 4A denotes time. A case where brightness of the subject is gradually increased from a first frame to a fourth frame, and where the exposure time period is gradually decreased in an order of T1, T2, T3, and T4 in order to suppress overexposure is assumed. For example, an exposure time period T1 of a first frame is 1/60 second. An exposure time period T2 of a second frame is shorter than T1. An exposure time period T3 of a third frame is shorter than T2, and an exposure time period T4 of a fourth frame is shorter than T3.

Figure 4B:
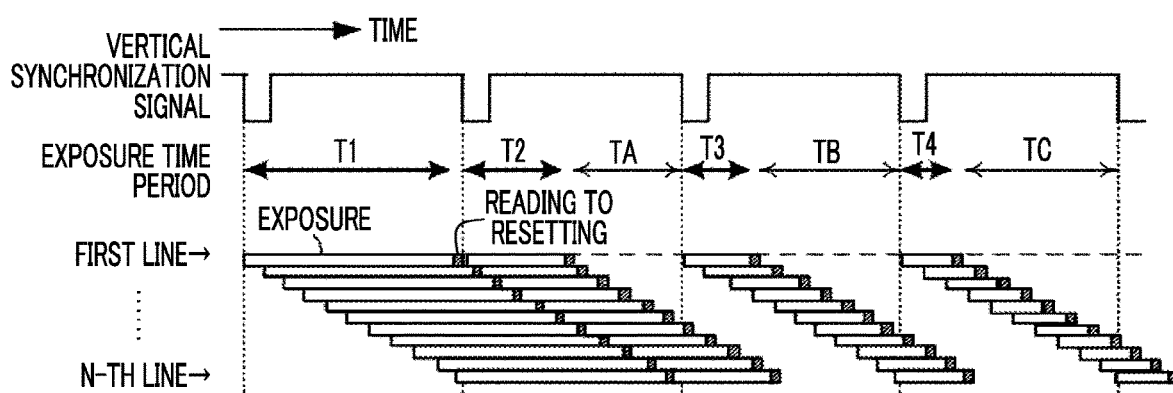
FIG. 4B is a detailed descriptive diagram illustrating an example of an operation from exposure to resetting of the imaging element.

In FIG. 4A, a start time of the exposure of a first line to an N-th line of the photoelectric conversion element 92, that is, resetting for the exposure, is illustrated by one diagonal line. However, specifically, as illustrated in FIG. 4B, an operation of the exposure after the resetting, the reading, the AD conversion, the storage in the memory, and the resetting is performed for each line. The storage of the image data in the memory 96 is performed after the AD conversion is finished, and thus, does not temporally overlap with the exposure time period. However, for description, the storage is illustrated by a bold diagonal line in the same period as the diagonal line illustrating the start time of the exposure. Furthermore, the output of the stored image data is illustrated by a bold diagonal line in the same period. In the following description, the operation illustrated in FIG. 4B will be represented as illustrated in FIG. 4A for simplification.

As illustrated in FIG. 4A, in a case where the exposure time period is T1, first, the first line is exposed for the time period T1, read out and subjected to the AD conversion after the exposure, and stored in the memory 96 as the image data of one line. The second line is exposed for the time period T1 later than the first line, read out and subjected to the AD conversion after the exposure, and stored in the memory 96 as the image data of one line. This reading processing is sequentially performed to the last N-th line, and the image data of all lines is stored in the memory 96 as the image data of the first frame. This operation is repeated in each frame.

The first frame rate does not change even in a case where the exposure time period is decreased. Thus, for example, in the first line, after the reading and the resetting are performed after the exposure of the exposure time period T2 for the second frame, a waiting time period TA occurs until the exposure for the third frame is started. Similarly, in the first line, after the reading and the resetting are performed after the exposure of the exposure time period T3 for the third frame, a waiting time period of a time period TB occurs until the exposure for the fourth frame is started. In addition, in the first line, after the reading and the resetting are performed after the exposure of the exposure time period T4 for the fourth frame, a waiting time period of a time period TC occurs until the exposure for a fifth frame is started.

Figure 5A:
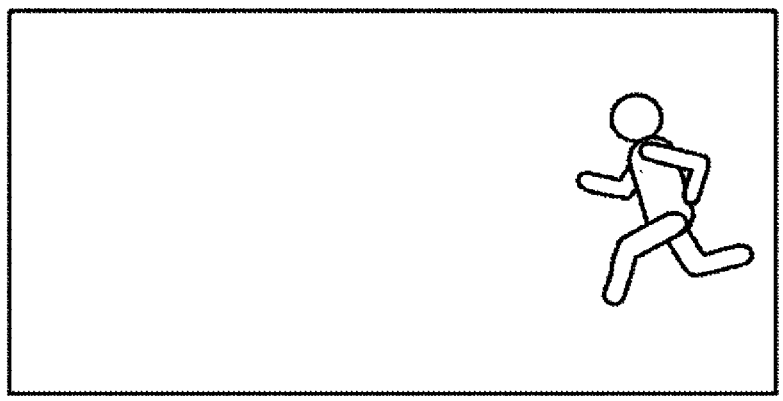
FIG. 5A is a schematic diagram for describing how a motion picture image is seen in the technology of the related art.
Figure 5B:
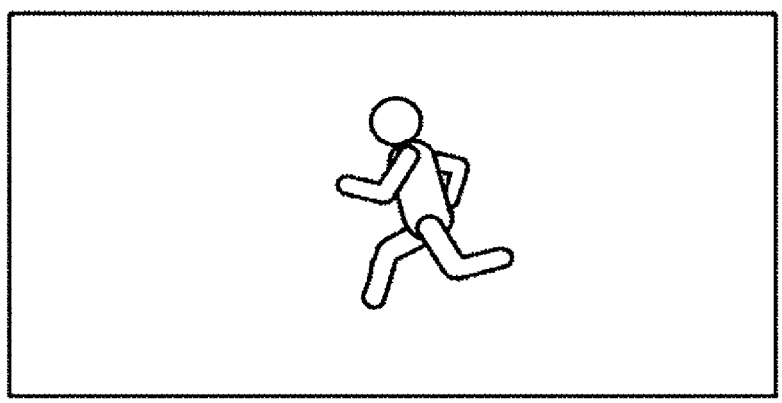
FIG. 5B is a schematic diagram for describing how the motion picture image is seen in the technology of the related art.
Figure 5C:
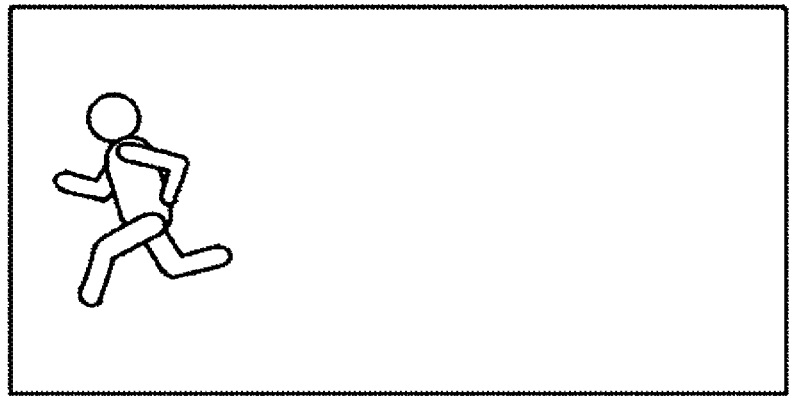
FIG. 5C is a schematic diagram for describing how the motion picture image is seen in the technology of the related art.
Figure 5D:
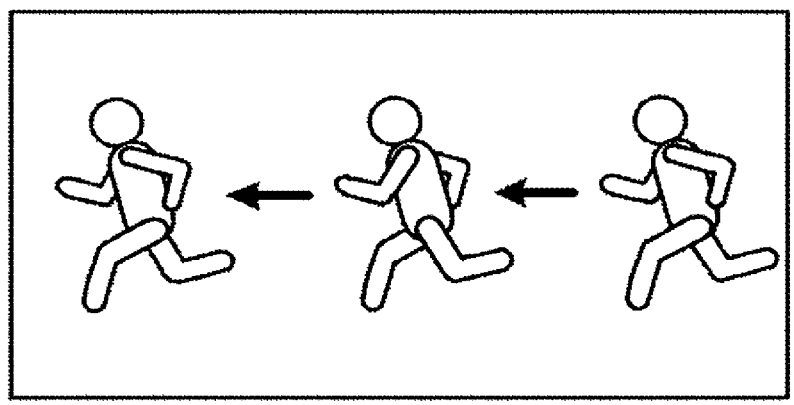
FIG. 5D is a schematic diagram for describing how the motion picture image is seen in the technology of the related art.

As the exposure time period is decreased, a waiting time period until the exposure of the subsequent frame is started is increased. The waiting time period occurs in common from the first line to the last N-th line. Thus, in a case of imaging a moving subject, the subject moves during the waiting time period. Thus, in a case where the second frame to the fourth frame are illustrated for each frame, for example, the image is intermittent as illustrated in FIG. 5A to FIG. 5C. In a case where the image is output as the motion picture image, a motion feels awkward such that the subject discontinuously moves as illustrated in FIG. 5D.

In order to display a smooth motion in the motion picture image, setting the exposure time period of one frame close to the output period is considered. Setting the exposure time period of one frame close to the output period will be referred to as widening a time period opening. By widening the time period opening, the waiting time period is decreased. Thus, the motion of the subject in one frame image is continuous with the motion of the subject in the subsequent frame, and the subject is seen as moving continuously and smoothly. However, in order to suppress the overexposure, the exposure time period is set to be decreased as the subject becomes bright. Thus, it may be difficult to widen the time period opening.

An operation of the imaging element 20 according to the first embodiment that resolves the above problem will be described. In the first embodiment, the first frame rate is changed to a frame rate higher than the second frame rate in connection with the exposure time period. Accordingly, a change in brightness of the subject can be handled. More specifically, the first frame rate is changed to be increased in accordance with a decrease in exposure time period. Accordingly, a relatively bright subject can be handled. However, the first frame rate is changed to a value higher than the second frame rate only in a case where the exposure time period is shorter than the output period. Changing the first frame rate to be higher than the second frame rate is performing the exposure a plurality of number of times, that is, more than once, within the output period.

Figure 6:
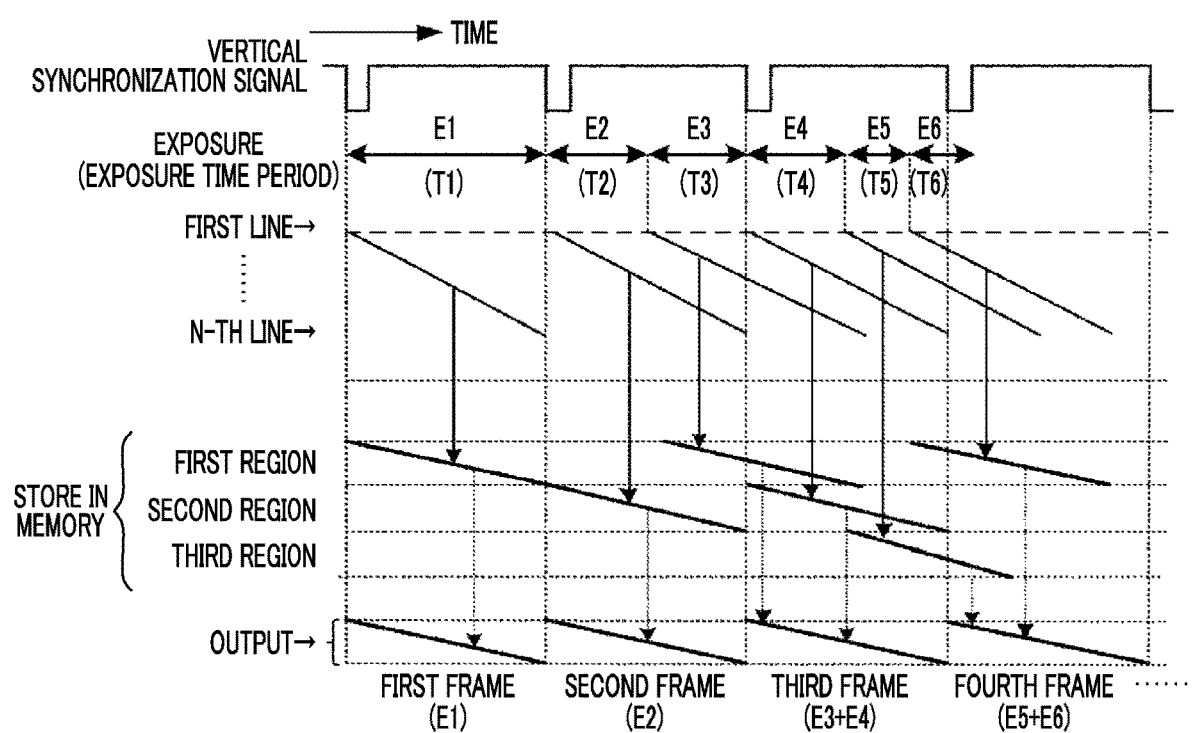
FIG. 6 is an operation conceptual diagram illustrating an example of exposure, reading, storage, and output of the imaging element according to the first embodiment.

As illustrated in FIG. 6 as an example, a case where the subject becomes bright with an elapse of time is considered. A horizontal axis in FIG. 6 denotes time. The second frame rate is set to 60 fps. In a case where the subject becomes gradually bright, the exposure time period of exposure E1 to exposure E6 is gradually decreased from T1 to T6. However, in the present embodiment, unlike a method illustrated in FIG. 4A, the exposure and the reading processing are continuously performed without the waiting time period. By doing so, the image data of a plurality of frames may be read out in parallel in one output period. For example, in the output period of the third frame illustrated in the drawing, the image data of maximum three frames related to the exposure E3, E4, and E5 are read out in parallel and stored. That is, the photoelectric conversion element driving circuit 94A reads out, in parallel, the image data of each of the plurality of frames captured within the output period that is defined by the second frame rate as a period in which the image data of one frame is output.

The exposure for imaging is restarted after the reading processing for the image data of one line is completed by the photoelectric conversion element driving circuit 94A after the start of the previous exposure. Particularly, it is preferable to restart the exposure without the waiting time period after the reading processing for the image data based on the previous exposure is completed. Accordingly, it is possible to set a state close to constant exposure, and a time period of non-exposure between the previous exposure and the subsequent exposure can be relatively decreased regardless of the exposure time period. While the image data is read out one line at a line in the first embodiment, one pixel may be read out at a time.

Figure 2B:
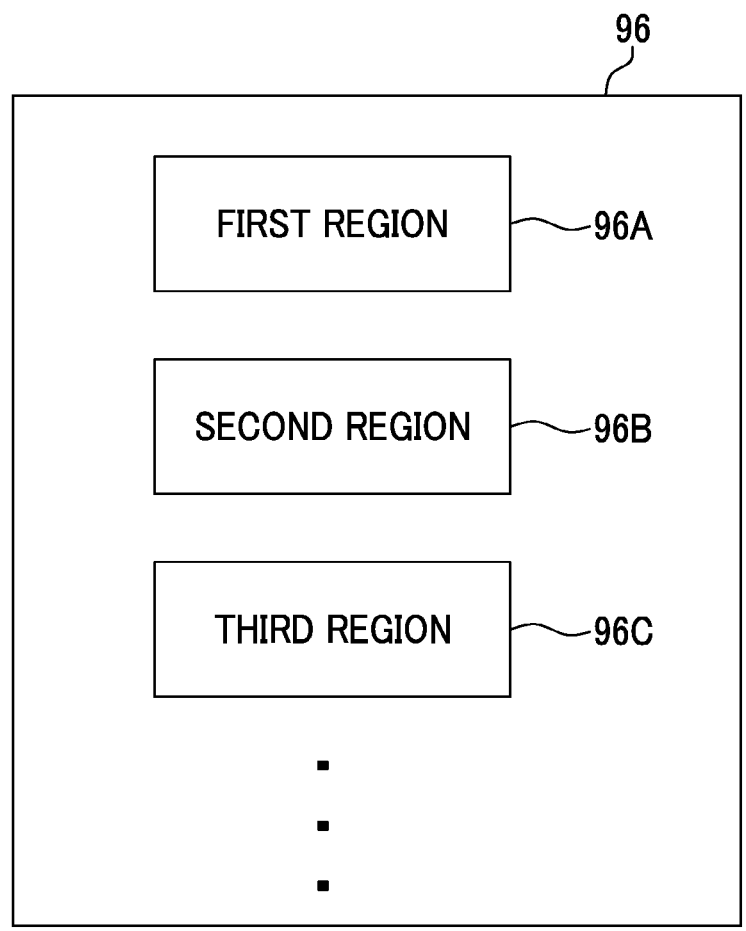
FIG. 2B is a diagram illustrating a plurality of storage regions of a memory.

As illustrated in FIG. 2B, the memory 96 includes a first region 96A, a second region 96B, a third region 96C, . . . that are a plurality of storage regions individually storing each image data. Hereinafter, the "storage region" will be referred to as the "region". As illustrated in FIG. 6, the image data obtained by the first exposure E1 (exposure time period T1) is read out by the photoelectric conversion element driving circuit 94A and subjected to the AD conversion by the AD conversion circuit 94B. The image data subjected to the AD conversion is stored in the first region 96A of the memory 96. The stored image data is output as the output image data of the first frame by the output circuit 94D and, for example, displayed on the first display 40. Accordingly, the user can visually recognize an image based on a plurality of pieces of image data output by the output circuit 94D.

After the image data of the first line is read out, the image data is reset, and the reading processing is finished. In a case where the reading processing is finished, the second exposure E2 (exposure time period T2) is started without the waiting time period. This will be referred to as continuous performing of the exposure and the reading processing. The above processing is performed for each line.

The image data obtained by the exposure E2 is read out, subjected to the AD conversion, and then, stored in the second region 96B of the memory 96 different from the first region 96A. After the image data obtained by the exposure E2 is read out, the image data is reset, and the exposure E3 is started. Reading of the image data obtained by the exposure E3 temporally overlaps in the middle of reading in the exposure E2 as illustrated in FIG. 6. Thus, the image data obtained by the exposure E3 is stored in the first region 96A of the memory 96 different from the second region 96B in which storage processing for the image data obtained by the exposure E2 is being executed. That is, the memory 96 stores, in parallel, each image data that is read out in parallel by the photoelectric conversion element driving circuit 94A.

As described above, the exposure and the reading processing are continuously performed from the exposure E1 to the exposure E6. The storage processing in the memory 96 is executed by selecting different regions among the first region 96A, the second region 96B, the third region 96C, . . . set in the memory 96 such that the storage processing is executed in parallel. By continuously performing the exposure and the reading processing, a plurality of images, that is, more than one image, can be captured within one output period.

The image data obtained by the exposure E2 is output as the output image data for the second frame. The output image data for the third frame is image data in which the image data obtained by the exposure E3 and the image data obtained by the exposure E4 are combined. In addition, the output image data for the fourth frame is image data in which the image data obtained by the exposure E5 and the image data obtained by the exposure E6 are combined. The image processing circuit 94C performs generation processing of generating the output image data of one frame by combining the image data of each of the plurality of frames stored in the memory 96.

The generation processing of combining the image data for the output image data can be performed using a well-known method. For example, the image processing circuit 94C generates the image data of one frame obtained by calculating an arithmetic mean of at least a part of the image data of each of the plurality of frames stored in the memory 96 in units of pixels. For example, in a case where a noise is superimposed on one of pieces of image data for calculating the arithmetic mean, the noise is reduced by calculating the arithmetic mean. Thus, deterioration of image quality can be prevented. In addition, while simple addition increases pixel values and causes the overexposure, calculation of the arithmetic means can prevent the overexposure. The combining processing can be performed on common pixels of at least a part of the plurality of pieces of image data. The combined output image data is stored in the memory 96. The output image data may be stored in a storage device other than the memory 96.

The output circuit 94D outputs the output image data, which is generated by the image processing circuit 94C and stored in the memory 96, to the rear stage circuit 90 at the second frame rate. The CPU 52 stores the output image data, which is output, in the primary storage portion 58 and displays the output image data on the first display 40 by the first display control portion 64.

Figure 7:
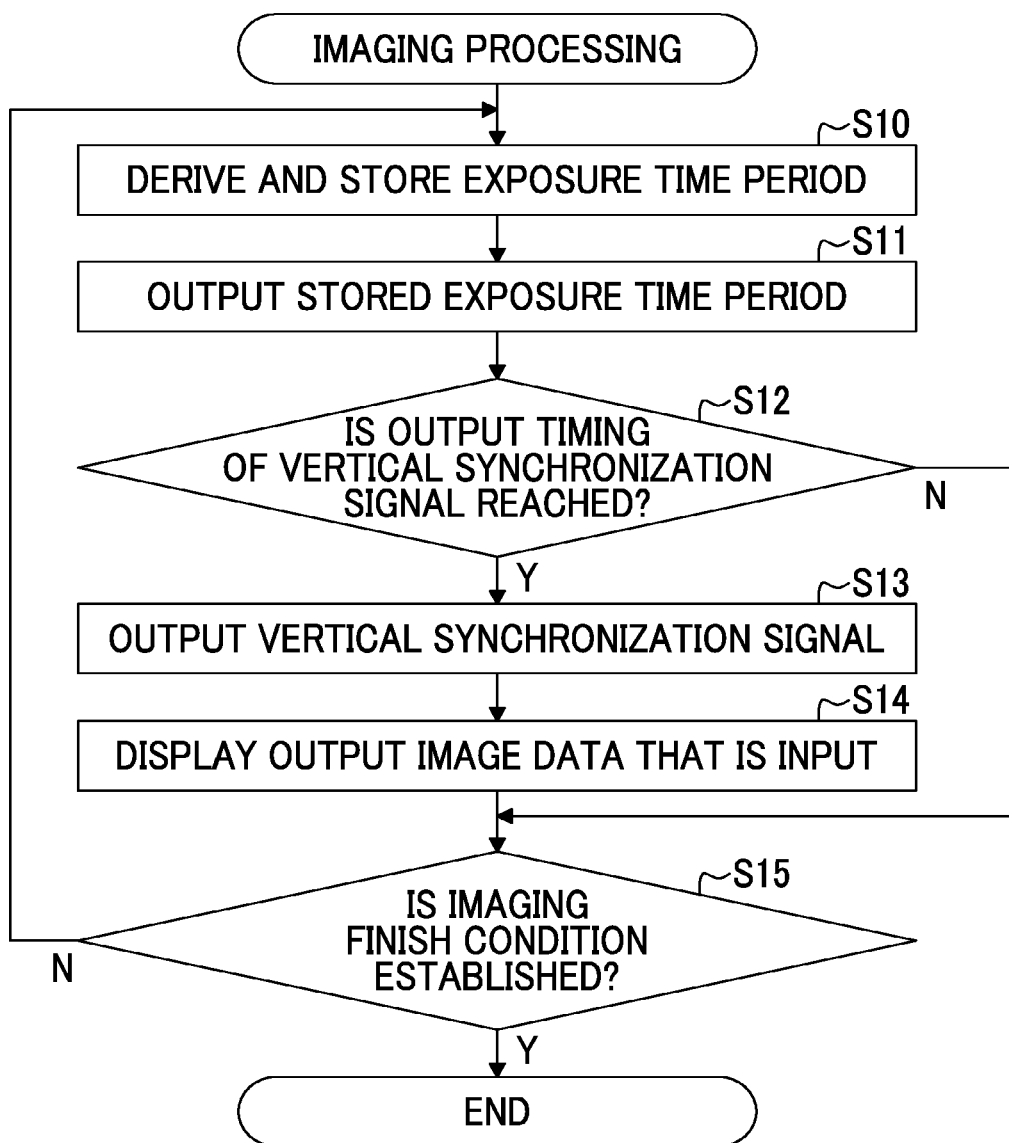
FIG. 7 is a flowchart illustrating an example of imaging processing according to the first embodiment.

The above processing will be described using a flowchart. First, imaging processing performed by the CPU 52 of the rear stage circuit 90 will be described using FIG. 7. In step S10, the CPU 52 derives the exposure time period corresponding to the brightness of the image indicated by the AE information and stores the exposure time period in the primary storage portion 58. Next, in step S11, the CPU 52 outputs the stored exposure time period to the device control portion 74. Next, in step S12, the CPU 52 determines whether or not an output timing of a vertical synchronization signal corresponding to the second frame rate is reached. In step S12, in a case where a negative determination is made, a transition is made to step S15. In step S12, in a case where a positive determination is made, a transition is made to step S13, and the CPU 52 outputs the vertical synchronization signal to the device control portion 74. Next, in step S14, the CPU 52 displays the output image data input from the imaging element 20 on the first display 40 by controlling the first display control portion 64. Then, the imaging processing transitions to step S15.

In step S15, the CPU 52 determines whether or not an imaging finish condition is established. In a case where a positive determination is made, an output indicating establishment of the imaging finish condition is provided to the device control portion 74, and then, the imaging processing is finished. For example, a case where a positive determination is made is a case where the user issues an instruction to finish imaging from the operation portion 54. In step S15, in a case where a negative determination is made, a return is made to step S10. The above processing is executed by executing the imaging program 60A by the CPU 52.

Figure 8:
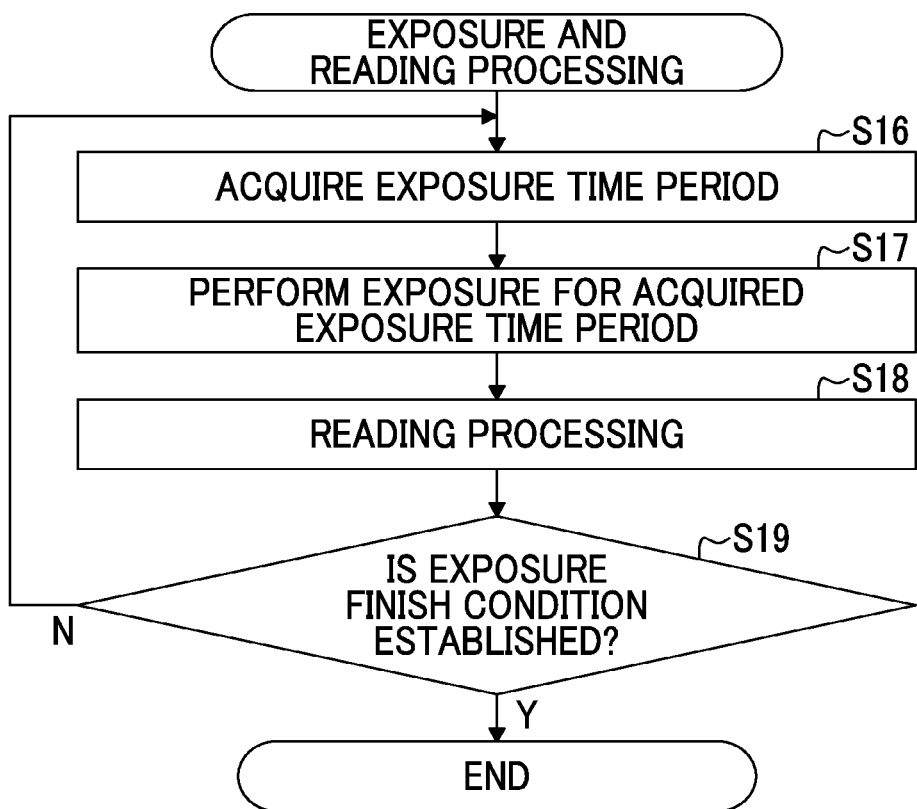
FIG. 8 is a flowchart illustrating an example of exposure and reading processing according to the first embodiment.

Next, exposure and reading processing executed by the imaging element 20 under control of the CPU 52 will be described using FIG. 8. First, in step S16, the photoelectric conversion element driving circuit 94A acquires the exposure time period input into the device control portion 74 from the CPU 52. Next, in step S17, the photoelectric conversion element driving circuit 94A controls the photoelectric conversion element 92 to perform the exposure for the acquired exposure time period. Next, in step S18, the photoelectric conversion element driving circuit 94A reads out the image data obtained by the exposure. The AD conversion circuit 94B performs AD conversion processing on the read image data and stores the image data subjected to the AD conversion in the memory 96. Next, in step S19, the photoelectric conversion element driving circuit 94A determines whether or not an exposure finish condition is established. For example, the exposure finish condition is established in a case where an input indicating establishment of the imaging finish condition is provided to the device control portion 74 from the CPU 52. In a case where a positive determination is made, the photoelectric conversion element driving circuit 94A and the AD conversion circuit 94B finish the exposure and reading processing. In a case where a negative determination is made, a return is made to step S16.

Figure 9:
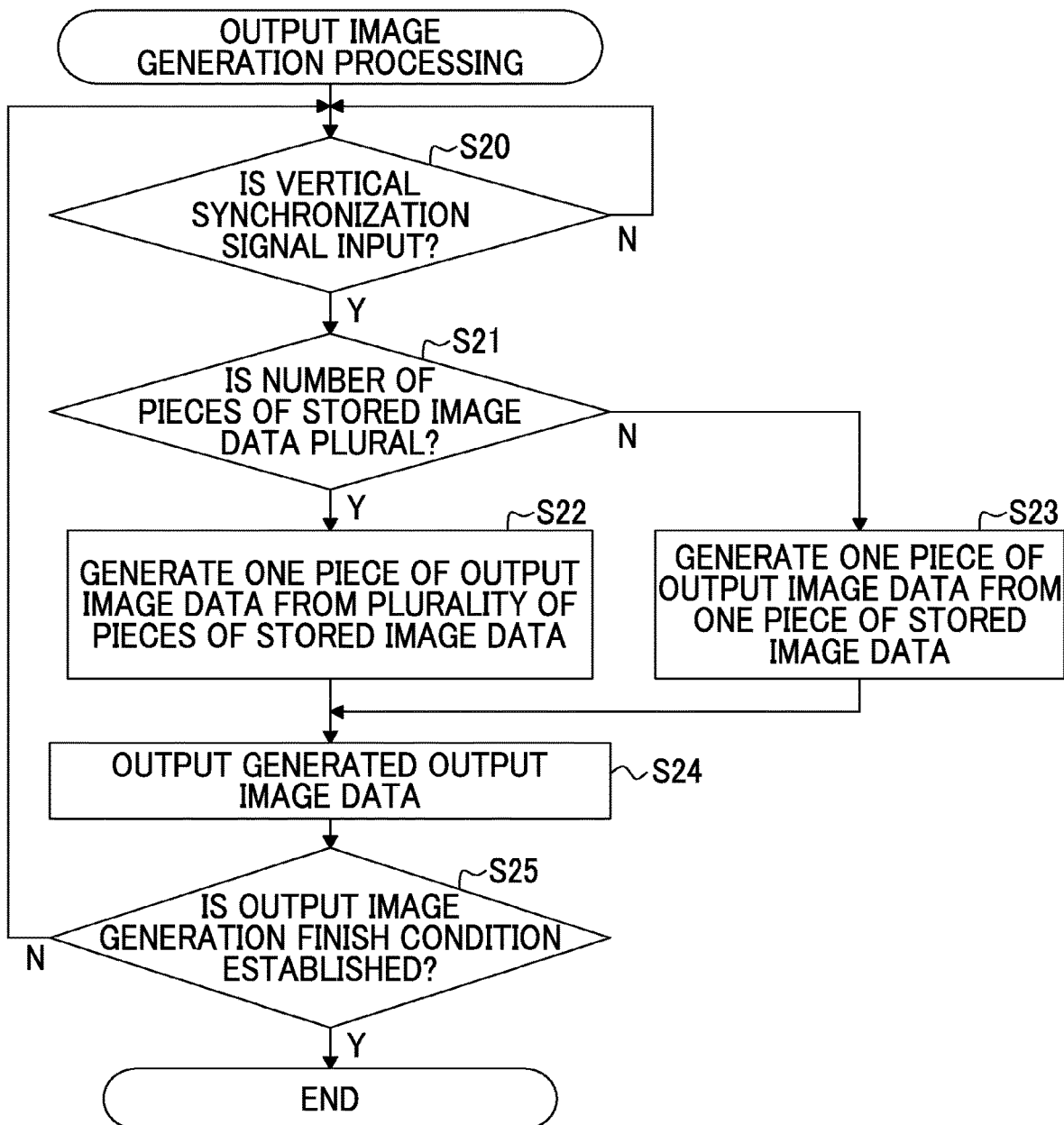
FIG. 9 is a flowchart illustrating an example of output image generation processing according to the first embodiment.

Next, output image generation processing executed by the imaging element 20 under control of the CPU 52 will be described using FIG. 9. In step S20, the image processing circuit 94C determines whether or not the vertical synchronization signal is input into the device control portion 74 from the CPU 52. In a case where a negative determination is made, step S20 is repeated. In a case where a positive determination is made, a transition is made to step S21. The image processing circuit 94C determines whether or not the number of pieces of outputtable image data currently stored in the memory 96 is plural. In a case where a plurality of pieces of outputtable image data are stored, a positive determination is made, and a transition is made to step S22. The image processing circuit 94C generates one piece of output image data by combining the plurality of pieces of image data. The generated output image data is stored in the memory 96 or another storage portion. In step S21, in a case where a negative determination is made, a transition is made to step S23. The image processing circuit 94C generates one piece of output image data from one piece of image data. The generated output image data is stored in the memory 96 or the other storage portion.

Next, in step S24, the output circuit 94D outputs the generated output image data to the I/F 56 of the rear stage circuit 90. Next, in step S25, the image processing circuit 94C determines whether or not an output image generation finish condition is established. For example, the output image generation finish condition is established in a case where an input indicating establishment of the imaging finish condition is provided to the device control portion 74 from the CPU 52. In step S25, in a case where a positive determination is made, the image processing circuit 94C finishes the output image generation processing. In a case where a negative determination is made, a return is made to step S20.

Figure 10A:
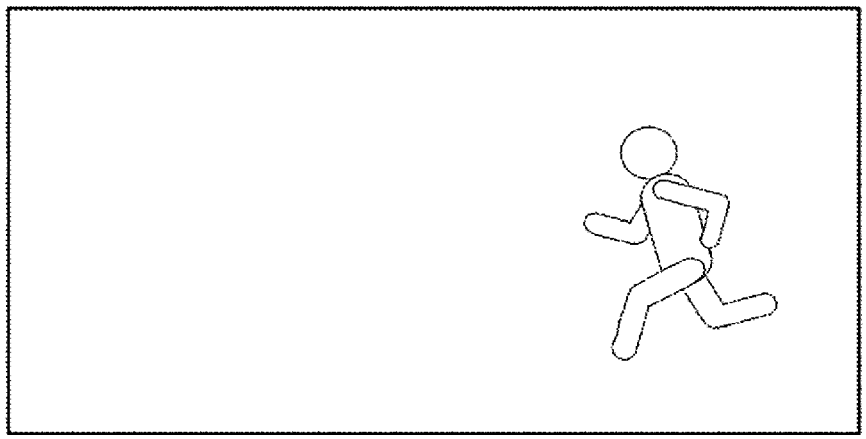
FIG. 10A is a schematic diagram for describing how a motion picture image output from the imaging element according to the first embodiment is seen.
Figure 10B:
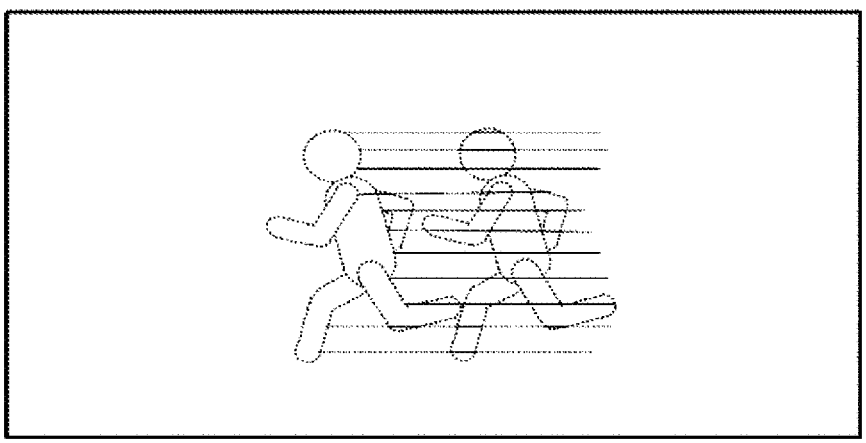
FIG. 10B is a schematic diagram for describing how the motion picture image output from the imaging element according to the first embodiment is seen.
Figure 10C:
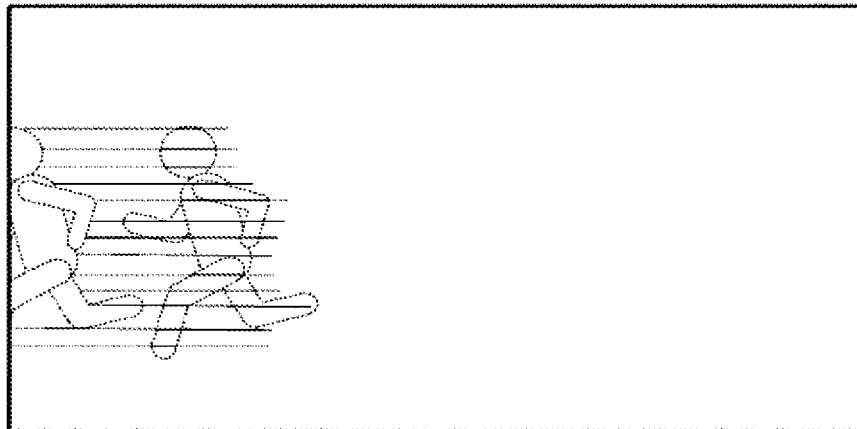
FIG. 10C is a schematic diagram for describing how the motion picture image output from the imaging element according to the first embodiment is seen.
Figure 10D:
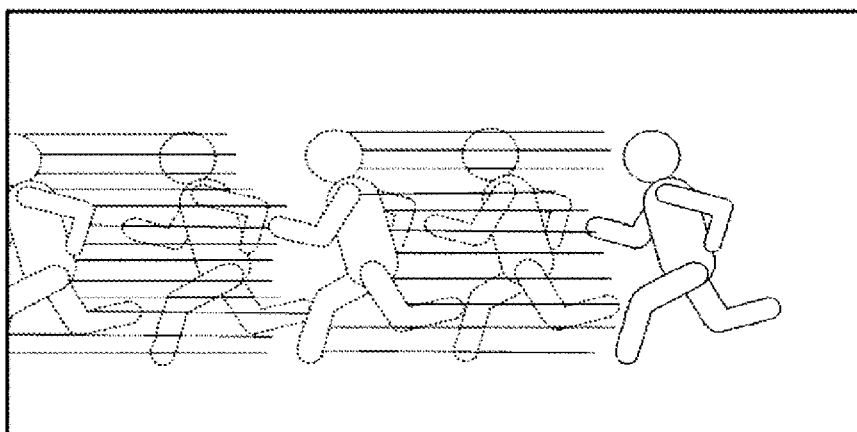
FIG. 10D is a schematic diagram for describing how the motion picture image output from the imaging element according to the first embodiment is seen.

As described above, by generating the output image data of one frame using the plurality of pieces of image data, an image in which a trajectory (afterimage) of movement of the subject in one output period is captured can be obtained. For example, in the second frame illustrated in FIG. 6, the exposure time period is T2, and the subject imaged in the exposure time period T2 is captured as illustrated in FIG. 10A. In the third frame illustrated in FIG. 6, the images in the exposure E3 and the exposure E4 are combined. Thus, an image, illustrated in FIG. 10B, in which the trajectory of movement of the subject in a total time period of the exposure time periods T3 and T4 is captured is obtained. Similarly, in the fourth frame, the images in the exposure E5 and the exposure E6 are combined. Thus, an image, illustrated in FIG. 10C, in which the trajectory of movement of the subject in a total time period of the exposure time periods T5 and T6 is captured is obtained. In a case where these images are seen as a motion picture image, the subject is seen as smoothly moving as illustrated in FIG. 10D.

In a case where the image processing circuit 94C combines the output image data, it is preferable to combine the output image data by adding up the image data such that the total exposure time period within one output frame is an exposure time period as close to the output period as possible. By doing so, the trajectory of movement of the subject within a time period corresponding to the output period can be combined in one output frame, and a more natural motion picture image can be obtained.

The output image data obtained by the above processing is stored in the memory 96 or the other storage portion. In addition, the output image data is displayed on the first display 40 as the live view image.

According to the imaging element 20 according to the first embodiment, the image data of which the total exposure time period is closer to the output period can be combined. Accordingly, a smooth motion picture image can be output, compared to a case of outputting an image captured in an exposure time period shorter than an exposure time period corresponding to an output frame rate.

Second Embodiment

As the exposure time period is decreased, the number of times of exposure in one output period is increased. Thus, the number of pieces of image data read out in parallel in one output period is increased. Meanwhile, the number of AD conversion columns performing the AD conversion may be limited. In a case where the number of pieces of image data read out in parallel in one output period is greater than the number of pieces of image data on which the AD conversion can be performed at the same time, the AD conversion is delayed, and the image data cannot be read out in parallel. Therefore, in the present embodiment, the photoelectric conversion element driving circuit 94A changes a reading speed of the image data in accordance with the number of pieces of image data read out in parallel. In other words, the reading speed of the image data is changed in accordance with the number of frames in which the image data is read out in parallel. The reading speed is a speed at which the reading processing is performed. Accordingly, the image data can be processed without delay.

Specifically, in the present embodiment, the photoelectric conversion element driving circuit 94A changes the reading speed of the image data in accordance with the number of frames in which the image data is read out in parallel, that is, the number of pieces of image data, and the number of AD conversion circuits, that is, the AD conversion columns, performing the AD conversion on the read image data.

Figure 11A:
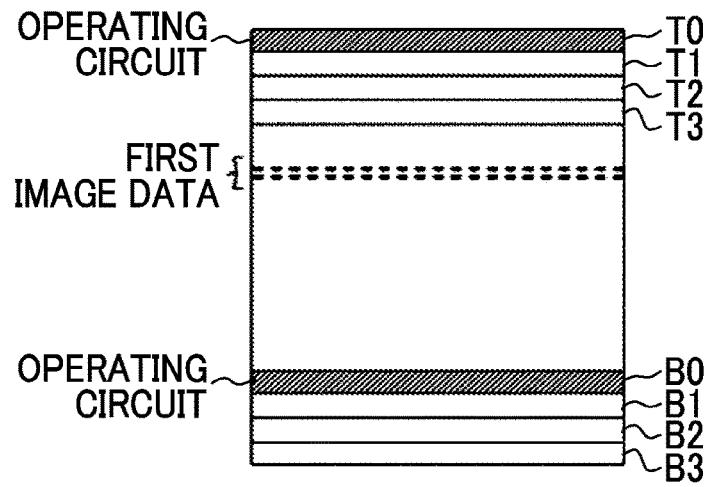
FIG. 11A is a conceptual diagram of an operation of performing AD conversion on one piece of image data by an AD conversion column according to the first embodiment.

In a second embodiment, as illustrated in FIG. 11A, the imaging element 20 includes total eight AD conversion columns including T0, T1, T2, T3, B0, B1, B2, and B3 as the AD conversion circuit 94B. The imaging element 20 executes the AD conversion processing on two lines in parallel using two AD conversion columns as one set at the same time. There are four sets of the AD conversion columns including the AD conversion columns T0 and B0, the AD conversion columns T1 and B1, the AD conversion columns T2 and B2, and the AD conversion columns T3 and B3. Hereinafter, the eight AD conversion columns T0 to T3 and B0 to B3 will be referred to as the AD conversion circuit 94B unless otherwise necessary to distinguish therebetween.

Figure 11B:
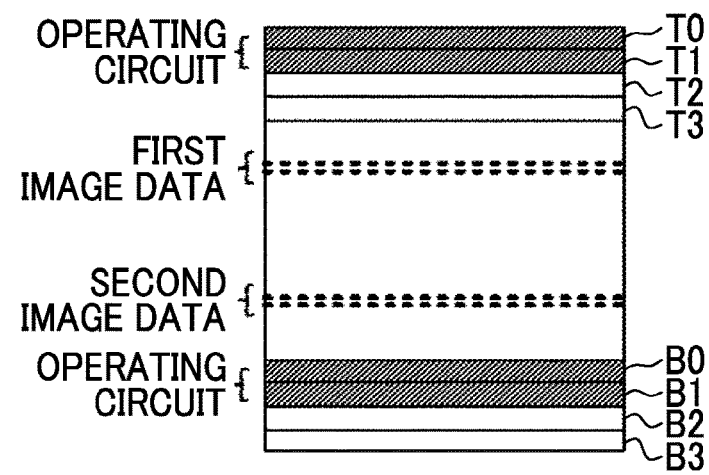
FIG. 11B is a conceptual diagram of an operation of performing AD conversion on two pieces of image data by the AD conversion column according to the first embodiment.
Figure 11C:
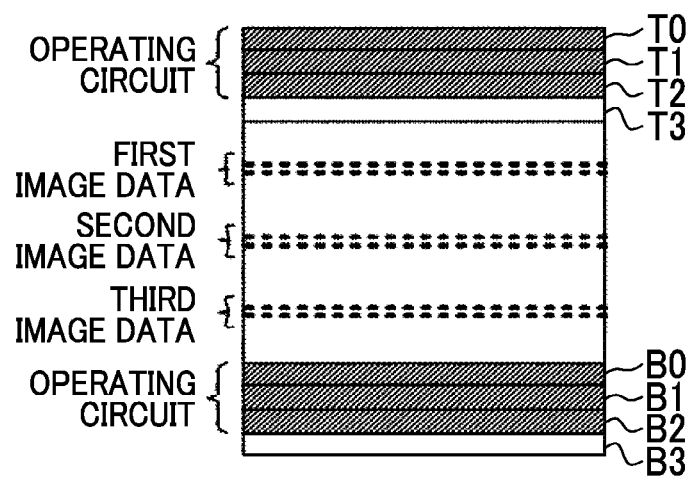
FIG. 11C is a conceptual diagram of an operation of performing AD conversion on three pieces of image data by the AD conversion column according to the first embodiment.
Figure 11D:
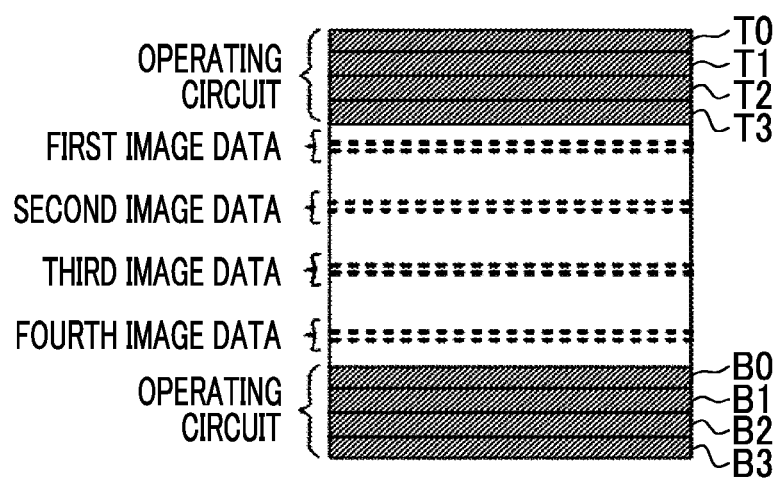
FIG. 11D is a conceptual diagram of an operation of performing AD conversion on four pieces of image data by the AD conversion column according to the first embodiment.

As illustrated in FIG. 11A, in a case of performing the AD conversion on only image data of a first image, the AD conversion is performed on two lines in parallel using one set of the AD conversion columns T0 and B0 among the eight AD conversion columns. In addition, as illustrated in FIG. 11B, in a case of performing the AD conversion on two pieces of image data of the first image and a second image, the AD conversion is performed on each of the two pieces of image data two lines at a time in parallel using two sets of the AD conversion columns T0 and B0 and the AD conversion columns T1 and B1. Similarly, as illustrated in FIG. 11C, in a case of performing the AD conversion on three pieces of image data of the first image to a third image, the AD conversion is performed on the three pieces of image data in parallel by three sets of the AD conversion columns by adding one set of the AD conversion columns T2 and B2 to the example illustrated in FIG. 11B. Similarly, as illustrated in FIG. 11D, in a case of performing the AD conversion on four pieces of image data of the first image to a fourth image, the AD conversion is performed on the four pieces of image data in parallel by further adding one set of the AD conversion columns T3 and B3.

By using the AD conversion columns as described above, the AD conversion processing can be performed on the image data of four frames, maximum eight lines, in parallel. In other words, the reading processing can be performed on the image data of four frames, maximum eight lines, in parallel.

Figure 12:
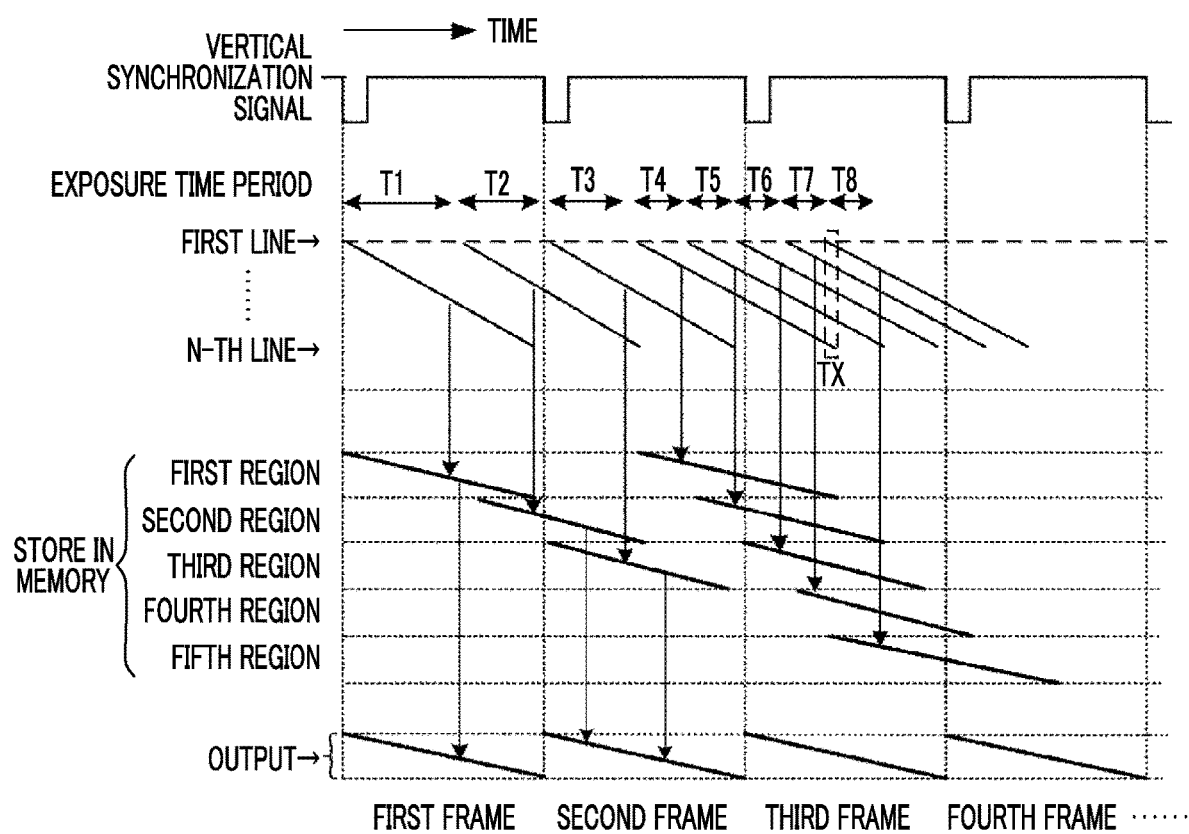
FIG. 12 is a schematic diagram illustrating an example of a problem in a case where an exposure time period of the imaging element is short.

Here, as illustrated in FIG. 12 as an example, a case where the exposure time period continuously changes to T4, T5, T6, T7, and T8 that are shorter than a predetermined first threshold value is considered. The exposure time periods T1 to T3 are exposure time periods longer than or equal to the first threshold value. The first threshold value can be set as an exposure time period in which images of the number of frames on which the AD conversion processing can be performed in parallel are acquired in one output period.

In this case, in a time period TX illustrated by a dotted line frame in FIG. 12, the reading processing for the image data of the exposure time periods T4 to T8 overlaps, and it is necessary to perform the reading processing for the image data of 10 lines, that is, five frames. However, as described above, the AD conversion columns are limited to the AD conversion processing for the image data of eight lines, that is, four frames. Thus, it is not possible to perform the AD conversion processing on the image data of five frames in parallel.

Therefore, the reading processing is performed by decreasing the reading speed of the image data. By doing so, the reading processing is performed on the image data of five or more frames in parallel. Specifically, in a case described using FIG. 12, the image data for which the exposure is performed in the exposure time periods T1 to T3 is processed at a normal processing speed of the AD conversion. Meanwhile, the image data for which the exposure is performed in the exposure time periods T4 to T8 shorter than the predetermined first threshold value is processed by decreasing the processing speed of the AD conversion from the normal processing speed.

Here, decreasing the processing speed of the AD conversion for the image data means that the AD conversion for each line of the image data of one frame is not continuously performed and is intermittently performed. The number of lines on which the four sets of the AD conversion columns can perform the AD conversion at the same time at a certain time is eight lines, and the number of pieces of image data on which the AD conversion processing can be performed in parallel is up to four. Therefore, for example, in a case of performing the AD conversion processing on the image data of five frames, the AD conversion processing is performed by allocating the four sets of the AD conversion columns in order for each line of the image data of five frames. Thus, image data on which the AD conversion processing is not performed occurs at a certain time. Consequently, the processing speed of the AD conversion for one piece of image data is apparently decreased.

Figure 13:
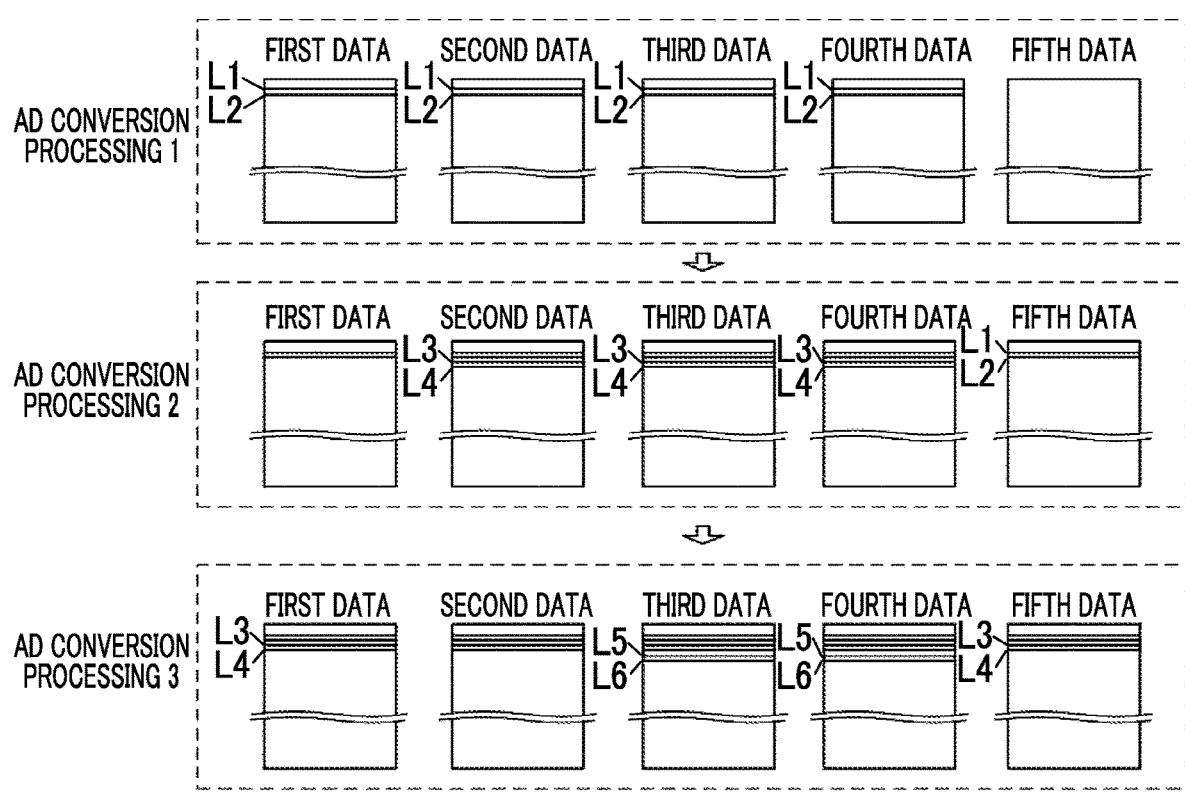
FIG. 13 is a schematic diagram illustrating an example of AD conversion processing of an imaging element according to a second embodiment that resolves the problem illustrated in FIG. 12.

Specifically, as illustrated in FIG. 13, the image data of five frames on which the AD conversion processing is to be performed in parallel is denoted by first data to fifth data. In the first AD conversion processing 1, the AD conversion is performed on a first line L1 (hereinafter, the first line will be referred to as L1, and a second line will be referred to as L2) and L2 of the first data to the fourth data. The AD conversion is not performed on the fifth data. In the subsequent AD conversion processing 2, the AD conversion is performed on L3 and L4 of the second data to the fourth data and L1 and L2 of the fifth data. The AD conversion is not performed on the first data. In the subsequent AD conversion processing 3, the AD conversion is performed on L5 and L6 of the third data and the fourth data and L3 and L4 of the fifth data and the first data. The AD conversion is not performed on the second data. In a case where such processing is performed, an AD conversion processing time period per piece of image data is apparently increased. Thus, a reading processing time period of each image data is also increased from a normal reading processing time period. However, the reading processing can be performed on the image data of five frames in parallel.

Figure 14:
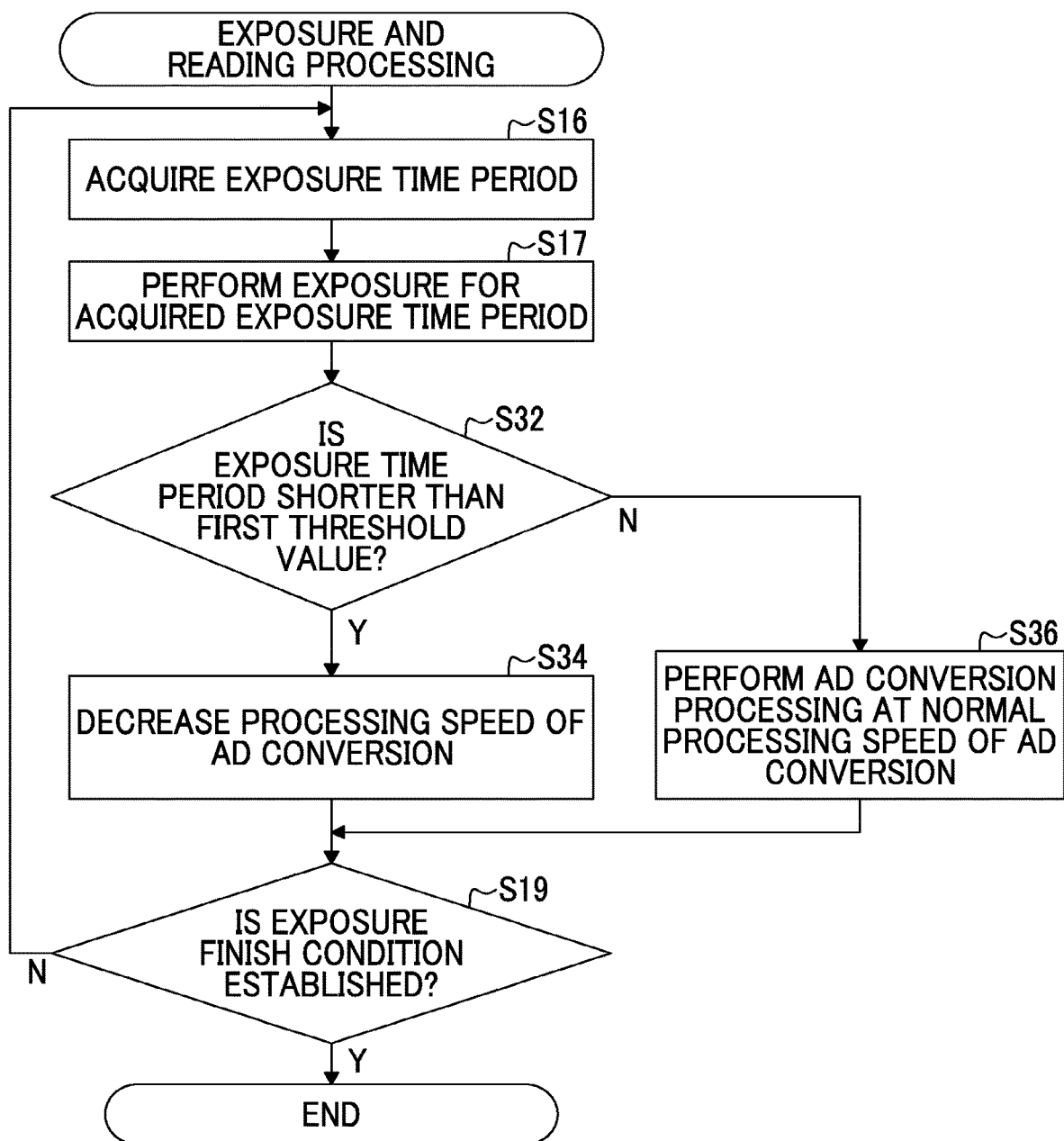
FIG. 14 is a flowchart illustrating an example of exposure and reading processing according to the second embodiment.

The exposure and reading processing according to the second embodiment will be described using FIG. 14. Steps in which the same processing as FIG. 8 described in the first embodiment is executed will be designated by the same step numbers in FIG. 14 and will not be described. Step S16 and step S17 are the same as a flow described using FIG. 8. Next, in step S32, the AD conversion circuit 94B determines whether or not the exposure time period is shorter than the predetermined first threshold value. In a case where a positive determination is made, a transition is made to step S34. In step S34, the AD conversion circuit 94B performs the AD conversion processing by decreasing the processing speed of the AD conversion. Then, the exposure and reading processing transitions to step S19. Meanwhile, in step S32, in a case where a negative determination is made, a transition is made to step S36. The AD conversion circuit 94B performs the AD conversion processing at the normal processing speed of the AD conversion. Then, the exposure and reading processing transitions to step S19. A flow from step S19 is the same as described using FIG. 8.

As described above, in a case of performing the reading processing for the number of pieces of image data exceeding the number of pieces of image data on which the AD conversion can be performed in parallel, the reading processing for the image data can be performed in parallel by decreasing the processing speed of the AD conversion for each image data from the normal processing speed of the AD conversion.

The number of AD conversion columns T0 to T3 and B0 to B3 is for illustrative purposes and is not limited to eight. In a case where the number of AD conversion columns is increased, the AD conversion processing can be performed on the image data of more frames. However, since cost is increased, it is not preferable to excessively increase the number of AD conversion columns. Thus, in the present embodiment, in order to process the image data without delay, the reading speed of the image data is decreased by narrowing down the number of AD conversion columns to an appropriate number.

According to the second embodiment described above, even in a case where the number of AD conversion columns is limited, the image data can be processed without delay.

Third Embodiment

As described in the second embodiment, the number of AD conversion columns performing the AD conversion processing in the reading processing is limited. In the present embodiment, a data amount in a case of performing the AD conversion processing on the image data is changed in accordance with the number of frames in which the image data is read out in parallel, and the number of AD conversion columns performing the AD conversion on the read image data. Specifically, in a case where the number of frames in which the image data is read out in parallel is increased, a conversion bit accuracy that is a data amount in a case of performing the AD conversion processing on the image data is decreased. In a case where the conversion bit accuracy is decreased, a processing time period of the AD conversion processing can be decreased. Thus, the AD conversion can be performed on the image data of more frames within the same time period. The conversion bit accuracy is the number of bits of the image data processed in the AD conversion processing performed once.

For example, in a case where the exposure time period is longer than a second threshold value (exposure time period>second threshold value), the conversion bit accuracy is set to 14 bits. In addition, in a case where the exposure time period is shorter than or equal to the second threshold value and longer than a third threshold value (third threshold value<exposure time period≤second threshold value), the conversion bit accuracy is set to 12 bits. Furthermore, in a case where the exposure time period is shorter than or equal to the third threshold value (exposure time period≤third threshold value), the conversion bit accuracy is set to 10 bits. For example, the second threshold value is a time period of ⅓ of one output period. In addition, for example, the third threshold value is a time period of ⅕ of one output period.

As the exposure time period is decreased, the number of frames in which the image data is read out in parallel is increased. In the present embodiment, as described above, as the exposure time period is decreased, the conversion bit accuracy of the AD conversion processing is decreased. That is, the conversion bit accuracy of the AD conversion processing is changed in accordance with the number of frames in which the image data is read out in parallel. As the conversion bit accuracy is decreased, processing data is decreased. Thus, the processing time period of the AD conversion processing is decreased.

A described numerical value of the conversion bit accuracy is for illustrative purposes, and a specific numerical value is not limited to the described numerical value. The number of frames in which it is necessary to perform the AD conversion processing on the image data in parallel based on the exposure time period depends on the number and processing performance of AD conversion columns and the second frame rate. In addition, a degree to which the processing time period of the AD conversion processing can be decreased by changing the conversion bit accuracy depends on the processing performance of the AD conversion columns. Thus, considering these numerical values, the conversion bit accuracy of the AD conversion processing and the second threshold value and the third threshold value for changing the conversion bit accuracy are appropriately set. In addition, the number of threshold values is not limited to two. For example, two conversion bit accuracies may be defined by one threshold value.

Figure 15:
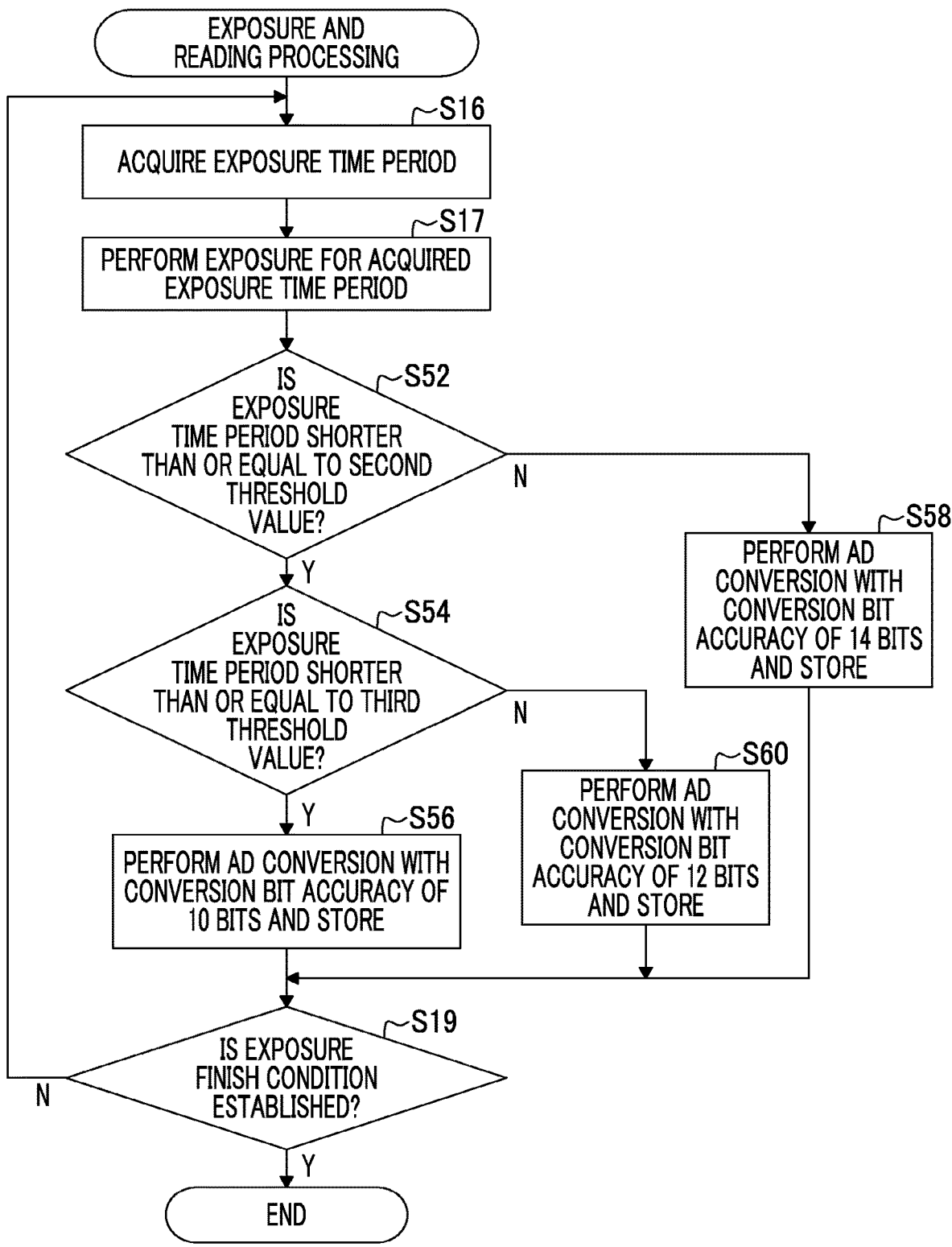
FIG. 15 is a flowchart illustrating an example of exposure and reading processing according to a third embodiment.

The exposure and reading processing in which the conversion bit accuracy of the AD conversion is changed will be described using FIG. 15. Steps in which the same processing as FIG. 8 described in the first embodiment is executed will be designated by the same step numbers in FIG. 15 and will not be described. Step S16 and step S17 are the same as in FIG. 8. Next, in step S52, the AD conversion circuit 94B determines whether or not the exposure time period is shorter than or equal to the predetermined second threshold value. In a case where the exposure time period is shorter than or equal to the second threshold value, a transition is made to step S54. Meanwhile, in a case where the exposure time period is longer than the second threshold value, a transition is made to step S58.

In step S58, the AD conversion circuit 94B performs the AD conversion processing on the image data read out by the photoelectric conversion element driving circuit 94A with the conversion bit accuracy of 14 bits. The AD conversion circuit 94B stores the image data subjected to the AD conversion in the memory 96, and the exposure and reading processing transitions to step S19.

In step S54, the AD conversion circuit 94B determines whether or not the exposure time period is shorter than or equal to the predetermined third threshold value. In a case where the exposure time period is shorter than or equal to the third threshold value, a transition is made to step S56. In step S56, the AD conversion circuit 94B performs the AD conversion processing on the image data read out by the photoelectric conversion element driving circuit 94A with the conversion bit accuracy of 10 bits. The AD conversion circuit 94B stores the image data subjected to the AD conversion in the memory 96, and the exposure and reading processing transitions to step S19.

Meanwhile, in step S54, in a case where the exposure time period is not shorter than or equal to the third threshold value, a transition is made to step S60. In step S60, the AD conversion circuit 94B performs the AD conversion processing on the image data read out by the photoelectric conversion element driving circuit 94A with the conversion bit accuracy of 12 bits. The AD conversion circuit 94B stores the image data subjected to the AD conversion in the memory 96, and the exposure and reading processing transitions to step S19. A flow from step S19 is the same as described in the first embodiment using FIG. 8.

According to the third embodiment described above, even in a case where the number of AD conversion columns is limited, the image data can be processed without delay. In addition, since the reading speed of the image data is not decreased from the normal reading speed unlike the second embodiment, there is no concern of an increase in rolling distortion.

Fourth Embodiment

In a case where imaging is performed for a long time period, the stored image data is increased, and a storage capacity of the memory 96 is exhausted. In the present embodiment, the CPU 52 outputs the output image data and then, deletes image data used for combining the output image data, which is output, from the image data stored in the memory 96. Accordingly, the memory 96 can be effectively used.

Figure 16:
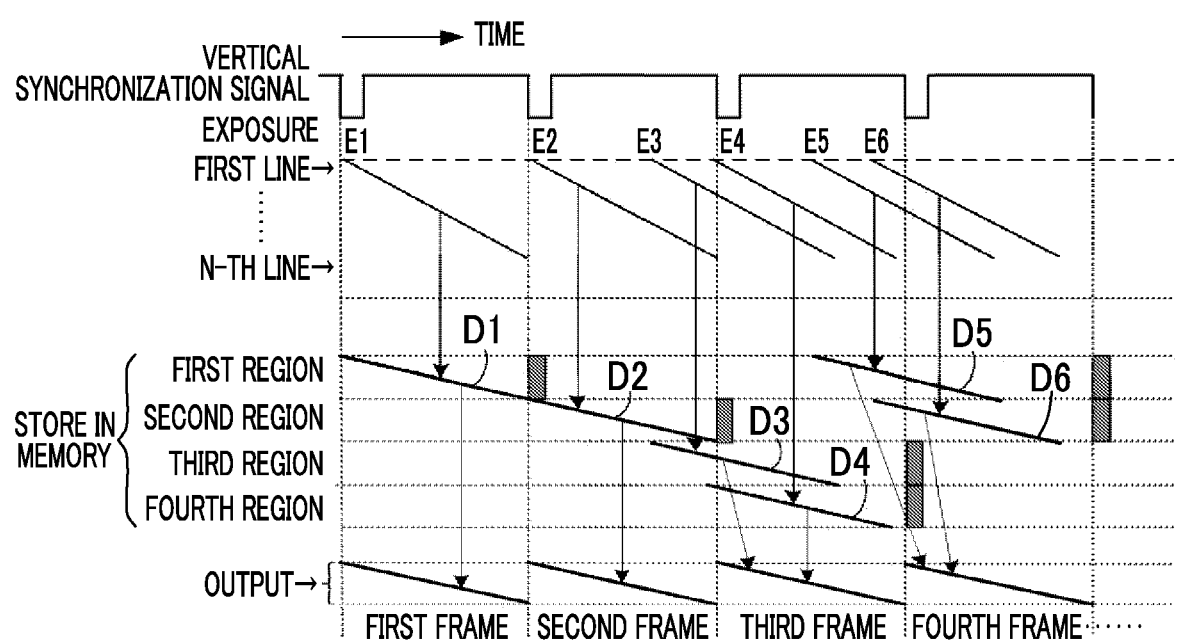
FIG. 16 is a schematic diagram illustrating an example of reading processing and output according to a fourth embodiment.

As illustrated in FIG. 16 as an example, the output image data output as the first frame is created based on image data D1 that is obtained and stored by the exposure E1. Therefore, the image data D1 is deleted after the first frame is output. In FIG. 16, deletion processing is illustrated by a frame with diagonal lines. Similarly, image data D2 that is used for creating the output image data output as the second frame and is based on the exposure E2 is deleted after the output image data of the second frame is output. The output image data of the third frame is obtained by combining image data D3 and image data D4 based on the exposure E3 and the exposure E4. Therefore, the image data D3 and the image data D4 are deleted after the third frame is output. Similarly, image data D5 and image data D6 that are used for the output image data of the fourth frame are deleted after the fourth frame is output. The image data D5 and the image data D6 are respectively stored in the first region 96A of the memory 96 from which the image data D1 is deleted, and the second region 96B of the memory 96 from which the image data D2 is deleted. By deleting the image data from the memory 96 after output, the memory 96 can be effectively used.

Fifth Embodiment

In a case where the exposure time period is decreased, and one piece of output image data is combined from the image data based on the exposure performed a plurality of number of times, a time lag may occur in an output image depending on a time at which the output image data is created by combining images. The time lag is a difference between an exposed time period and an output time period. In a case where combining is performed using the image data for which the exposure is performed at a time more away from a timing of output, the time lag of the output image is further increased.

In the present embodiment, partial image data that is a part of image data is combined from the plurality of pieces of image data. Specifically, for example, a case where image data for which the exposure is performed earlier than the output period or the exposure is started earlier than the output period is output as the output image data is considered. In this case, the image processing circuit 94C generates the output image data by combining the remaining image data of the output image data that is output so far in the middle of output of the output image data, with the partial image data of the image data for which the exposure is performed at a time closer to the output. For example, the image data for which the exposure is performed at a time closer to the output is image data that is being newly stored during the output. In addition, the partial image data to be combined is partial image data that corresponds in pixel position to the remaining image data of the output image data output so far. By using this method, the output image data of which a part is temporally new can be output.

Figure 17:
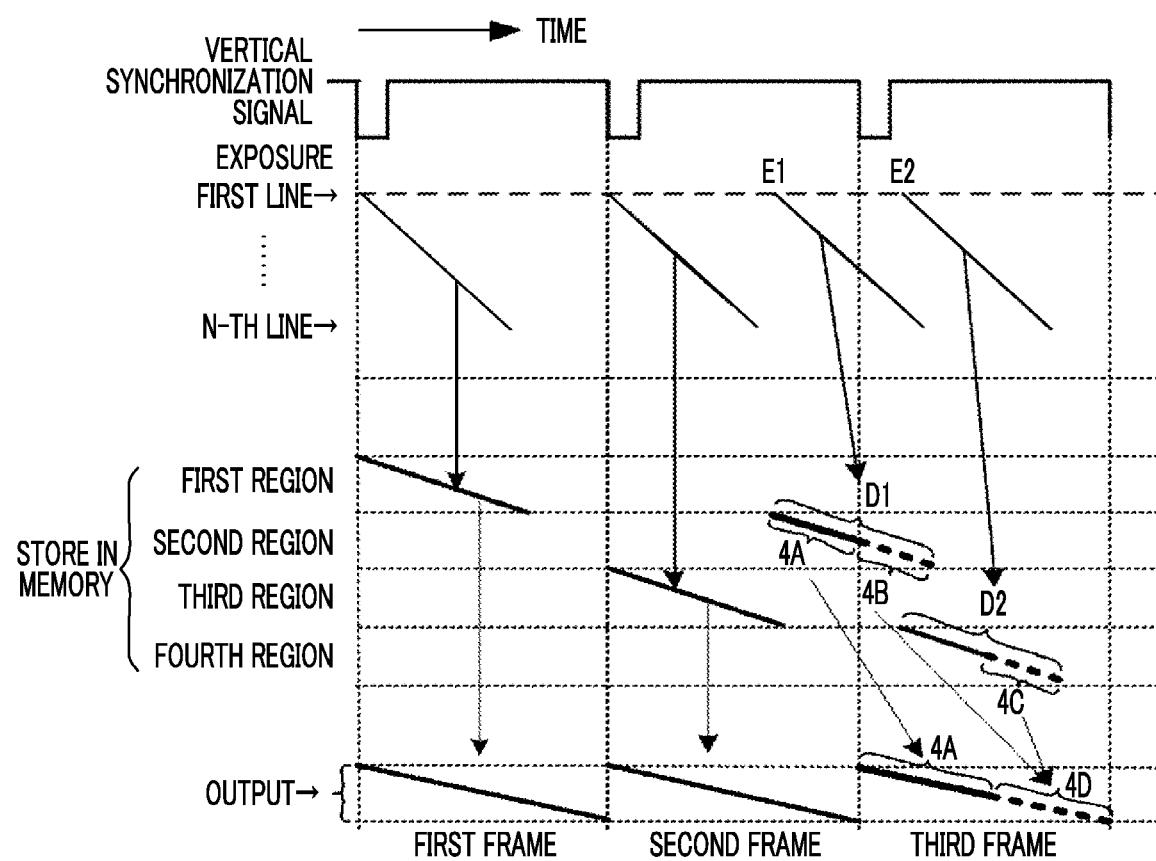
FIG. 17 is a schematic diagram illustrating an example of reading processing and output according to a fifth embodiment.

As illustrated in FIG. 17 as an example, partial image data 4A of the first line to an n-th line of the image data D1 stored in the memory 96 based on the exposure E1 is being output as the third frame. The image data D2 that can be output in the third frame and is based on the exposure E2 is being stored in the memory 96 at a time at which output of the partial image data 4A is finished. Thus, the image processing circuit 94C combines the image data D2 with the image data D1. In a case where the number of lines is denoted by N, n is an integer greater than or equal to 2 and less than N.

Specifically, the image processing circuit 94C generates partial image data 4D by combining partial image data 4B of the (n+1)-th line to the N-th line (last line) of the image data D1 based on the exposure E1 with partial image data 4C of the (n+1)-th line to the N-th line of the image data D2 based on the exposure E2. The output circuit 94D outputs the generated partial image data 4D subsequently to the partial image data 4A. For example, the combining is combining based on the arithmetic mean.

As described above, by performing combining by combining the partial image data of common pixels between the image data D1 and the temporally new image data D2, the output image data of which the part is temporally new can be output as the third frame.

Modification Example

In the fifth embodiment, instead of combining the output image data with newly stored image data in the middle of the output, replacement with the image data stored during the output can be performed.

Figure 18:
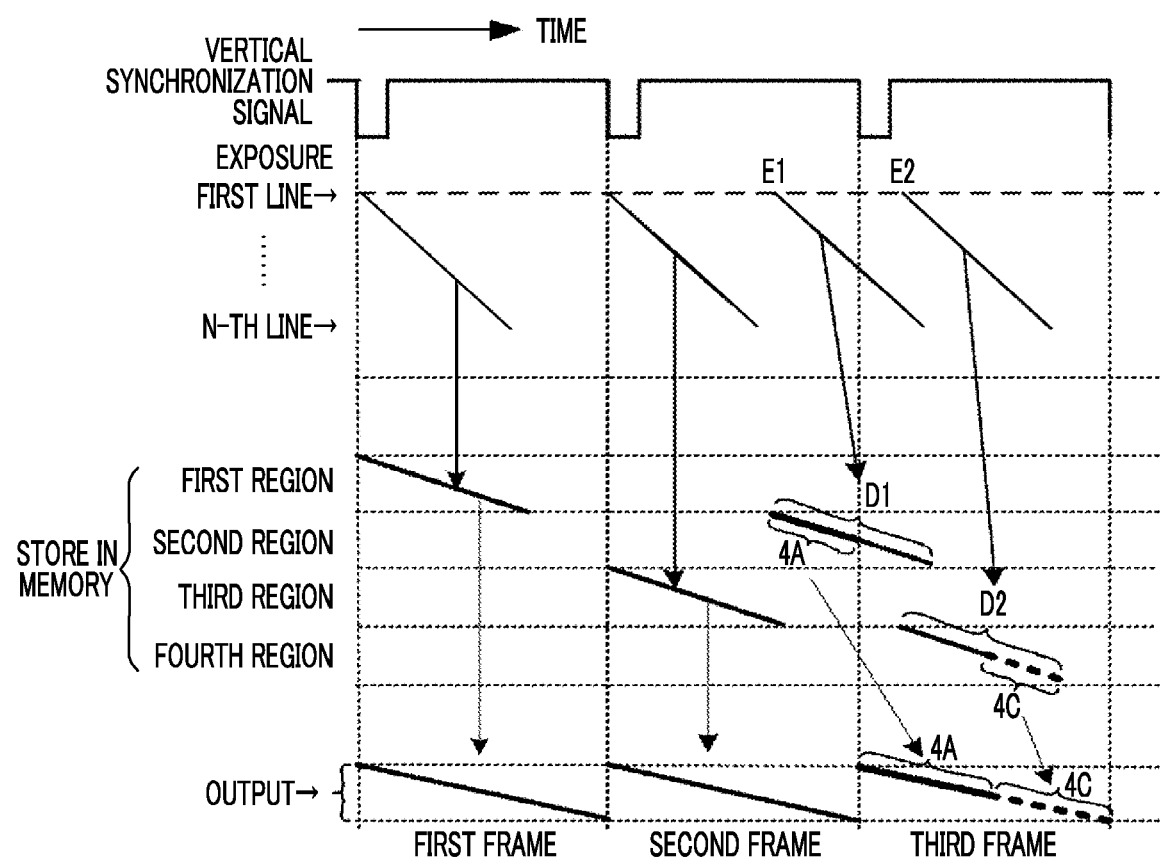
FIG. 18 is a schematic diagram illustrating an example of reading processing and output according to a modification example of the fifth embodiment.

As illustrated in FIG. 18 as an example, the third frame is output by performing replacement with the partial image data 4C of the image data D2 based on the exposure E2 after the partial image data 4A of the image data D1 based on the exposure E1 is output. The partial image data 4A and the partial image data 4C are described above. Accordingly, the output image data of which the part is temporally new can be output as the third frame.

Figure 19:
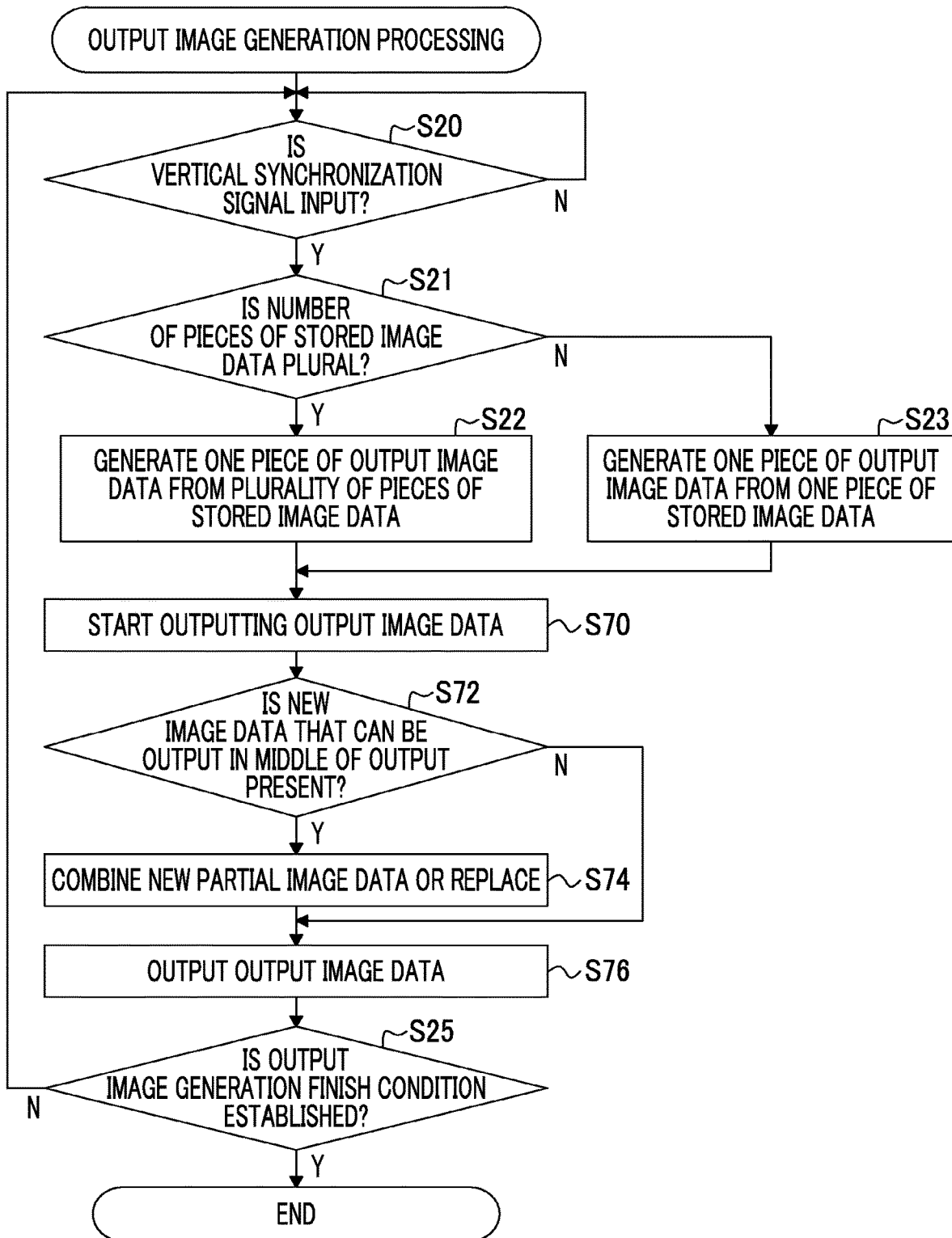
FIG. 19 is a flowchart illustrating an example of output image generation processing according to the fifth embodiment.

Output image generation processing of the fifth embodiment and the modification example will be described using FIG. 19. Steps in which the same processing as FIG. 9 described in the first embodiment is executed will be designated by the same step numbers in FIG. 19 and will not be described. Steps S20, S21, S22, and S23 are the same as a flow described using FIG. 9. Next, in step S70, the output circuit 94D starts outputting the output image data. Next, in step S72, the image processing circuit 94C determines whether or not new image data that can be output in the middle of the output is present. In a case where a positive determination is made, the output image generation processing transitions to step S74. The image processing circuit 94C combines partial image data that is a part of the new image data, or newly generates partial image data for the remaining output by performing replacement with the partial image data. Next, in step S76, the output circuit 94D outputs the generated remaining partial image data.

Meanwhile, in step S72, in a case where a negative determination is made, the output image generation processing transitions to step S76, and the output circuit 94D outputs the remaining output image data. After step S76, the output image generation processing transitions to step S25. A flow from step S25 is the same as described using FIG. 9.

According to the fifth embodiment described above, the output image data of which the part is temporally new can be output.

Figure 20:
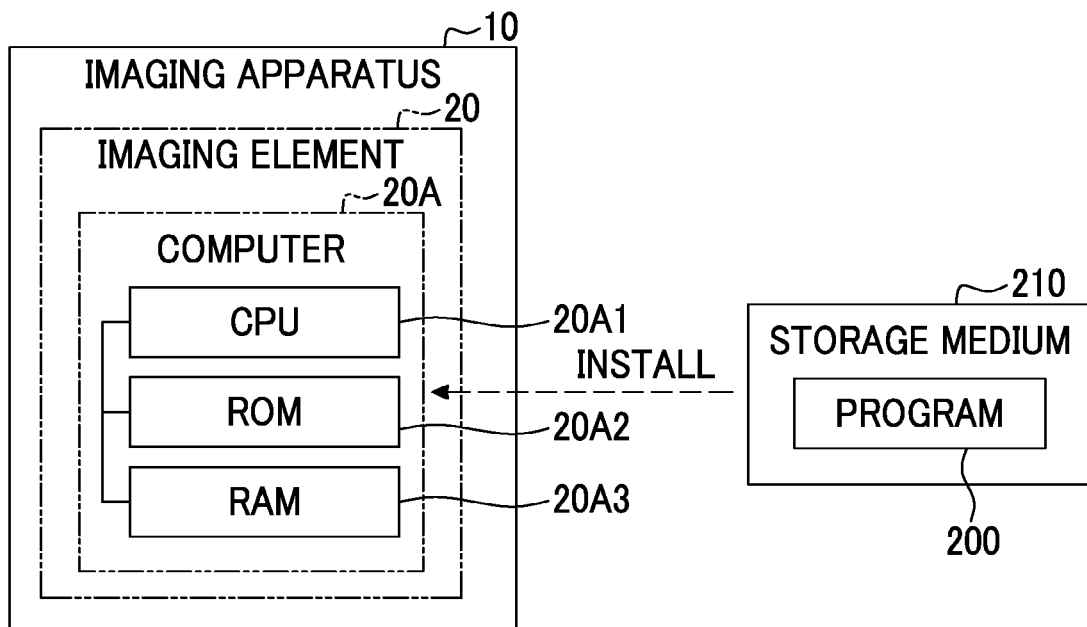
FIG. 20 is a conceptual diagram illustrating an example of an aspect of installing a program on the imaging element according to each embodiment from a storage medium storing the program.

For example, as illustrated in FIG. 20, a program 200 of various types causing a computer 20A incorporated in the imaging element 20 to execute the imaging processing, the exposure and reading processing, and the output image generation processing is stored in a storage medium 210. The computer 20A comprises a CPU 20A1, a ROM 20A2, and a RAM 20A3. The program 200 of the storage medium 210 is installed on the computer 20A. The CPU 20A1 of the computer 20A executes the imaging processing, the exposure and reading processing, the output image generation processing, and the like in accordance with the program 200. A single CPU is illustrated as the CPU 20A1. However, the technology of the present disclosure is not limited thereto, and a plurality of CPUs may be employed instead of the CPU 20A1.

Any portable storage medium such as an SSD or a USB memory is illustrated as an example of the storage medium 210.

In addition, the program 200 may be stored in a storage portion of another computer, a server apparatus, or the like connected to the computer 20A through a communication network (not illustrated), and the program 200 may be downloaded in response to a request from the imaging apparatus 10 or the like. In this case, the downloaded program 200 is executed by the computer 20A.

In addition, the computer 20A may be disposed on the outside of imaging element 20. In this case, the computer 20A may control the processing circuit 94 in accordance with the program 200.

Various processors illustrated below can be used as a hardware resource for executing various types of processing described in each of the embodiments. For example, as described above, a CPU that is a general-purpose processor functioning as the hardware resource for executing the various types of processing according to the embodiments of the technology of the present disclosure by executing software, that is, the program, is illustrated as a processor. In addition, a dedicated electric circuit such as an FPGA, a PLD, or an ASIC that is a processor having a circuit configuration dedicatedly designed to execute a specific type of processing is illustrated as a processor.

The hardware resource for executing the various types of processing according to the embodiments of the technology of the present disclosure may be configured with one of those various processors or may be configured with a combination of two or more processors of the same type or different types (for example, a combination of a plurality of FPGAs or a combination of a CPU and an FPGA). In addition, the hardware resource for executing various types of processing according to the embodiments of the technology of the present disclosure may be one processor.

As an example of a configuration with one processor, first, as represented by a computer such as a client and a server, a form in which one processor is configured with a combination of one or more CPUs and software, and in which this processor functions as the hardware resource for executing the various types of processing according to the embodiments of the technology of the present disclosure is available. Second, as represented by a system-on-a-chip (SoC) or the like, a form of using a processor that implements, by one IC chip, a function of the entire system including a plurality of hardware resources for executing the various types of processing according to the embodiments of the technology of the present disclosure is available. The various types of processing according to the embodiments of the technology of the present disclosure are implemented using one or more of the various processors as the hardware resource.

Furthermore, as a hardware structure of those various processors, more specifically, an electric circuit in which circuit elements such as semiconductor elements are combined can be used.

Figure 21:
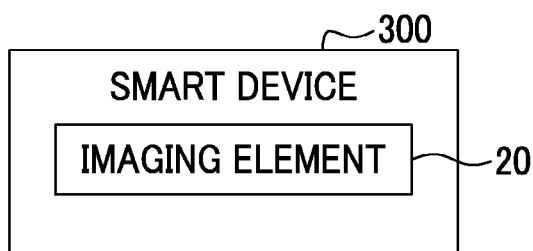
FIG. 21 is a block diagram illustrating an example of a schematic configuration of a smart device incorporating the imaging element according to each embodiment.

While an interchangeable lens camera is illustrated as the imaging apparatus 10 in each of the embodiments, the technology of the present disclosure is not limited thereto. For example, the technology of the present disclosure may be applied to a smart device 300 illustrated in FIG. 21. The smart device 300 illustrated in FIG. 21 is an example of the imaging apparatus according to the embodiments of the technology of the present disclosure. The imaging element 20 described in each of the embodiments is mounted in the smart device 300. Even with the smart device 300 configured in such a manner, the same actions and effects as the imaging apparatus 10 described in each of the embodiments are obtained. The technology of the present disclosure can be applied to not only the smart device 300 but also a PC or a wearable terminal apparatus.

While the first display 40 and the second display 80 are illustrated as a display device in each of the embodiments, the technology of the present disclosure is not limited thereto. For example, a separate display that is retrofit into the imaging apparatus main body 12 may be used as the "display portion (display)" according to the embodiments of the technology of the present disclosure.

In addition, the imaging processing, the exposure and reading processing, and the output image generation processing described in each of the embodiments are merely an example. Accordingly, unnecessary steps may be deleted, new steps may be added, or a processing order may be rearranged without departing from a gist of the present disclosure.

All documents, patent applications, and technical standards disclosed in the present specification are incorporated in the present specification by reference to the same extent as in a case where each of the documents, patent applications, technical standards is specifically and individually indicated to be incorporated by reference.

What is claimed is:

1. An imaging element comprising:
a processor that is configured to read out, at a first frame rate, image data of each frame obtained by imaging a subject, process the image data, and output the processed image data at a second frame rate; and
a memory that stores the image data read out by the processor,
wherein the first frame rate is a frame rate higher than the second frame rate,
the processor is configured to read out the image data of a plurality of frames in parallel within an output period that is defined by the second frame rate as a period in which the image data of one frame is output,
the memory stores, in parallel, the image data read out in parallel by the processor, and
the processor is configured to perform generation processing of generating output image data of one frame using the image data of the plurality of frames stored in the memory and output the output image data generated by the generation processing at the second frame rate.

2. The imaging element according to claim 1,
wherein the first frame rate is changed in connection with an exposure time period.

3. The imaging element according to claim 2,
wherein the first frame rate is increased as the exposure time period is decreased.

4. The imaging element according to claim 1,
wherein after a start of exposure, the exposure for imaging is restarted after reading processing for the image data of at least one pixel by the processor is completed.

5. The imaging element according to claim 1,
wherein the processor is configured to change a reading speed of the image data in accordance with the number of frames in which the image data is read out in parallel.

6. The imaging element according to claim 5,
wherein the processor is configured to change the reading speed of the image data in accordance with the number of frames in which the image data is read out in parallel, and a number of AD conversion circuits performing AD conversion on the read image data.

7. The imaging element according to claim 5,
wherein the processor is configured to change a data amount in a case of performing AD conversion processing on the image data, in accordance with the number of frames in which the image data is read out in parallel, and the number of AD conversion circuits performing AD conversion on the read image data.

8. The imaging element according to claim 1,
wherein the memory includes a plurality of storage regions individually storing the plurality of pieces of image data.

9. The imaging element according to claim 1,
wherein the generation processing is processing of generating image data of one frame obtained by calculating an arithmetic mean of at least a part of the image data of the plurality of frames stored in the memory in units of pixels.

10. The imaging element according to claim 1,
wherein in the generation processing, the output image data of one frame is generated by combining partial image data that is a part of the image data, from a plurality of pieces of the image data.

11. The imaging element according to claim 1,
wherein at least a photoelectric conversion element and the memory are formed in one chip.

12. The imaging element according to claim 11,
wherein the imaging element is a laminated imaging element in which the photoelectric conversion element is laminated with the memory.

13. An imaging apparatus comprising:
the imaging element according to claim 1; and
a control processor configured to perform a control for displaying an image based on the output image data output by the processor on a display.

14. An imaging method comprising:
a step of reading out, at a first frame rate, image data of each frame obtained by imaging a subject;
a step of storing the image data;
a step of processing the image data; and
a step of outputting the processed image data at a second frame rate lower than the first frame rate,
wherein in the step of reading out, the image data of a plurality of frames is read out in parallel within an output period that is defined by the second frame rate as a period in which the image data of one frame is output,
in the step of storing, image data read out in parallel is stored in parallel,
in the step of processing, output image data of one frame is generated using the stored image data of the plurality of frames, and
in the step of outputting, the generated output image data is output at the second frame rate.

15. A non-transitory computer-readable storage medium storing a program causing a computer to execute:
a procedure of reading out, at a first frame rate, image data of each frame obtained by imaging a subject;
a procedure of storing the image data;
a procedure of processing the image data; and
a procedure of outputting the processed image data at a second frame rate lower than the first frame rate,
wherein in the procedure of reading out, the image data of a plurality of frames is read out in parallel within an output period that is defined by the second frame rate as a period in which the image data of one frame is output,
in the procedure of storing, image data read out in parallel is stored in parallel,
in the procedure of processing, output image data of one frame is generated using the stored image data of the plurality of frames, and in the procedure of outputting, the generated output image data is output at the second frame rate.

* * * * *